(12) United States Patent
Chen et al.

(10) Patent No.: US 11,327,223 B2
(45) Date of Patent: May 10, 2022

(54) MULTIMODE OPTICAL FIBER WITH INCREASED BANDWIDTH

(71) Applicant: CORNING INCORPORATED, Corning, NY (US)

(72) Inventors: Xin Chen, Painted Post, NY (US); Kangmei Li, Painted Post, NY (US); Ming-Jun Li, Painted Post, NY (US); Anping Liu, Horseheads, NY (US); Simit Mayank Patel, Greensboro, NC (US); Jeffery Scott Stone, Addison, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/215,434

(22) Filed: Mar. 29, 2021

(65) Prior Publication Data

US 2021/0325599 A1     Oct. 21, 2021

Related U.S. Application Data

(60) Provisional application No. 63/023,487, filed on May 12, 2020, provisional application No. 63/010,271, filed on Apr. 15, 2020.

(51) Int. Cl.
| | |
|---|---|
| *G02B 6/028* | (2006.01) |
| *G02B 6/036* | (2006.01) |
| *H04B 10/2581* | (2013.01) |
| *H04B 10/50* | (2013.01) |
| *H04B 10/69* | (2013.01) |

(52) U.S. Cl.
CPC ......... *G02B 6/0288* (2013.01); *G02B 6/0365* (2013.01); *H04B 10/2581* (2013.01); *H04B 10/50* (2013.01); *H04B 10/69* (2013.01)

(58) Field of Classification Search
None
See application file for complete search history.

(56) References Cited

U.S. PATENT DOCUMENTS

| | | | |
|---|---|---|---|
| 8,385,703 | B2 | 2/2013 | Bennett et al. |
| 9,052,435 | B2 | 6/2015 | Zhang et al. |

(Continued)

FOREIGN PATENT DOCUMENTS

| | | |
|---|---|---|
| WO | 2013/003016 A1 | 1/2013 |
| WO | 2013/181182 A1 | 12/2013 |

OTHER PUBLICATIONS

International Search Report and Written Opinion of the International Searching Authority; PCT/US21/25296; dated Jun. 21, 2021; 13 pages; European Patent Office.

(Continued)

*Primary Examiner* — David W Lambert
(74) *Attorney, Agent, or Firm* — Amy T. Lang

(57) ABSTRACT

A multimode optical fiber having a core region. The core region includes silica, has an outer radius $r_1$, and has a maximum relative refractive index of about 1.5% or less. Additionally, the multimode optical fiber is configured to have an effective bandwidth of about 4.7 GHz-Km or greater for an excited portion of the core region that has a diameter greater than 50 microns, the effective bandwidth being at a wavelength that is within a range of between about 800 and about 1370 nm.

20 Claims, 14 Drawing Sheets

(56) References Cited

U.S. PATENT DOCUMENTS

2013/0322836 A1* 12/2013 Bickham .............. G02B 6/0288
 385/124
2016/0266308 A1* 9/2016 Bookbinder ......... G02B 6/0365

OTHER PUBLICATIONS

Chen et al., "25 Gb/s transmission over 820 m of MMF using a multimode launch from an integrated silicon photonics transceiver", In Optics Express vol. 22, Issue 2, 2014, pp. 2070-2077.

* cited by examiner

MULTIMODE OPTICAL FIBER WITH INCREASED BANDWIDTH

This application claims the benefit of priority to U.S. Provisional Patent Application Ser. No. 63/010,271 filed on Apr. 15, 2020 and to U.S. Provisional Patent Application Ser. No. 63/023,487 filed on May 12, 2020, the content of which is relied upon and incorporated herein by reference in its entirety.

FIELD

The present disclosure relates to optical fibers and, more specifically, to high bandwidth multimode optical fibers.

BACKGROUND

Optical fibers, including multimode optical fibers are used in data centers and fiber home networks, among other applications. In particular, multimode optical fibers are used in optical telecommunications for local area networks (LANs) and in data centers due to their relatively large data-carrying capacity (bandwidth) and their ability to carry optical signals at different optical wavelengths via wavelength division multiplexing (WDM). Different types of multimode fibers used in optical telecommunications include OM1, OM2, OM3 and OM4 types, with the OM4 type being widely used for 10 Gigabit (G), 40 G, and 100 G Ethernet for data centers, financial centers, and corporate campuses. Recently, a new standard for multimode optical fibers has been proposed and standardized by TIA, which is referred to as OM5 and documented in TIA-492AAAE.

SUMMARY

In order to meet the OM4 standard for modal bandwidth, as set forth by TIA, the multimode optical fiber must have an effective modal bandwidth (EMB) of 4700 MHz-km at 850 nm. For a multimode optical fiber to meet the OM5 standard, the fiber must meet the OM4 effective modal bandwidth requirement at 850 nm while additionally providing an effective modal bandwidth at 953 nm of 2470 MHz-km.

The multimode optical fibers disclosed herein have an effective modal bandwidth that meet both the OM4 and OM5 standards. Additionally, the multimode optical fibers disclosed herein advantageously maintain a low attenuation loss while providing such a high effective modal bandwidth. The multimode optical fibers disclosed herein also have a high connector offset tolerance with low insertion loss, thus providing optical fibers that are very beneficial in, for example, fiber to the server applications (FTTS). Furthermore, the multimode optical fibers disclosed herein have a wide operating wavelength range, which can be optimized to target peak bandwidth wavelength for a given index profile.

As discussed further below, the multimode optical fibers disclosed herein comprise a relatively large core diameter, as compared with traditional multimode optical fibers. The large core diameter advantageously provides a reduced effective relative refractive index of the excited core area, when used with an encircled flux launch condition or launched directly from a commercial VCSEL based transceiver. Due to the reduced effective relative refractive index over the excited portion of the core, the multimode optical fibers have an effective modal bandwidth that is greatly increased compared with traditional multimode optical fibers.

According to a first aspect, a multimode optical fiber is provided that has a core region. The core region including silica, having an outer radius $r_1$, and having a maximum relative refractive index of about 1.5% or less. Additionally, the multimode optical fiber is configured to have an effective bandwidth of about 4.7 GHz-Km or greater for an excited portion of the core region that has a diameter greater than 50 microns, the effective bandwidth being at a wavelength that is within a range of between about 800 and about 1370 nm.

According to another aspect, a multimode optical fiber is provided that has a core region. The core region including silica and having an outer radius $r_1$ that is about 30 microns or greater. Additionally, the core region is configured to have an effective relative refractive index within a range of about 0.30% to about 0.80% for an excited portion of the core region that has a diameter greater than 50 microns.

According to another aspect, a multimode optical fiber is provided that has a core region. The core region including silica and having an outer radius $r_1$. Additionally, the core region has a maximum relative refractive index of about 1.5% or less. The multimode optical fiber is configured to have an effective relative refractive index of about 0.95% or less for an excited portion of the core region that has a diameter greater than 50 microns.

According to another aspect, a multimode optical fiber is provided that has a core region. The core region including silica and having a maximum relative refractive index of lower than 1.0% and an alpha value in a range of about 0.9 to about 2.3 at a wavelength of 850 nm. The core region has an optical etendue within a range of about 110 micron$^2$ to about 150 micron$^2$ when excited with an encircled flux launch condition. Additionally the multimode optical fiber is configured to have a modal bandwidth of about 4.7 GHz-Km or greater, the modal bandwidth being at a wavelength that is within a range of between about 800 nm and about 1370 nm.

As discussed further below, effective relative refractive index and effective bandwidth refer to the relative refractive index and the bandwidth, respectively, for an excited portion of the core region.

Additional features and advantages are set forth in the detailed description that follows, and in part will be apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures.

DETAILED DESCRIPTION

Figure 1:
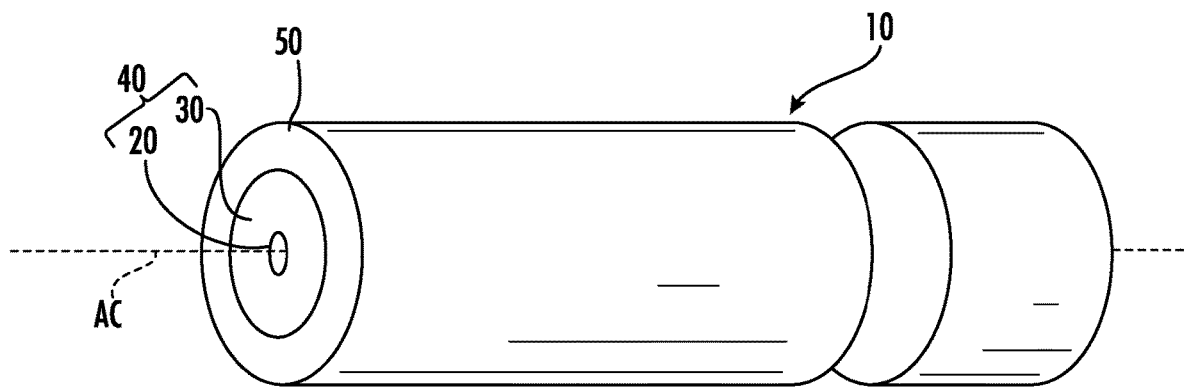
FIG. 1 is a front isometric view of an exemplary multimode optical fiber, according to embodiments disclosed herein.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

Any relative terms like top, bottom, side, horizontal, vertical, etc., are used for convenience and ease of explanation and are not intended to be limiting as to direction or orientation.

The limits on any ranges cited herein are considered to be inclusive and thus to lie within the range, unless otherwise specified.

"Optical fiber" refers to a waveguide having a glass portion surrounded by a coating. The glass portion includes a core and a cladding, and is referred to herein as a "glass fiber".

"Radial position", "radius", or the radial coordinate "r" refers to radial position relative to the centerline (r=0) of the fiber.

The term "refractive index profile" or "relative refractive index profile," as used herein, is the relationship between the refractive index or the relative refractive index and the radius of the fiber.

The term "relative refractive index," as used herein, is defined as:

$$\Delta(r)\% = 100 \times \frac{(n(r)^2 - n_{REF}^2)}{2n(r)^2},$$

where n(r) is the refractive index at radius r of the optical fiber, unless otherwise specified, and r=0 corresponds to the centerline of the fiber. The relative refractive index is defined at 850 nm unless otherwise specified. In the embodiments described herein, the reference index $n_{REF}$ is the refractive index of the outer cladding. In the embodiments that do not include an outer cladding, the reference index $n_{REF}$ is the refractive index of pure silica. As used herein, the relative refractive index is represented by Δ or referred to as 'Delta' or 'delta' and its values are given in units of "%," unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "up-dopant," as used herein, refers to a dopant which raises the refractive index of glass relative to pure, undoped $SiO_2$. The term "down-dopant," as used herein, is a dopant which has a propensity to lower the refractive index of glass relative to pure, undoped $SiO_2$. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

The term "α-profile" or "alpha profile," as used herein, refers to a relative refractive index profile, expressed in terms of Δ which is in units of "%," where r is the radius and which follows the equation, $$\Delta = \Delta_{1max}\left[1 - \left(\frac{r}{r_1}\right)^\alpha\right],$$

where $\Delta_{1max}$ is the maximum relative refractive index, $r_1$ is the radius of the core, r is in the range $r_i \le r \le r_f$, $\Delta$ is as defined above, $r_i$ is the initial point of the α-profile, $r_f$ is the final point of the α-profile, and α is an exponent which is a real number. For a graded index profile, the alpha value is less than 10. The term "parabolic," as used herein, includes substantially parabolically shaped refractive index profiles which may vary slightly from an α value of 2.0 at one or more points in the core, as well as profiles with minor variations and/or a centerline dip.

"Trench volume" is defined as:

$$\left|2\int_{r_{Trench,inner}}^{r_{Trench,outer}} \Delta_{Trench}(r) r dr\right|$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is in absolute value and a positive quantity and will be expressed herein in units of % $\Delta$micron$^2$, % $\Delta$-micron$^2$, % $\Delta$-μm$^2$, or % $\Delta$μm$^2$, whereby these units can be used interchangeably herein. A trench region is also referred to herein as a depressed-index cladding region and trench volume is also referred to herein as $V_3$.

Macrobend performance is determined according to FOTP-62 (JEC-60793-1-47) by wrapping 2 turns of an optical fiber around a 15 mm and/or a 30 mm diameter mandrel and measuring the increase in attenuation due to the bending using an encircled flux (EF) launch condition (also referred to as a "restricted launch condition"). The encircled flux is measured by launching an overfilled pulse into an input end of a 2 m length of InfiniCor® 50 micron core optical fiber which is deployed with a 1 wrap on a 25 mm diameter mandrel near the midpoint. The output end of the InfiniCor® 50 micron core optical fiber is spliced to the fiber under test, and the measured bend loss is the difference of the attenuation under the prescribed bend condition to the attenuation without the bend.

The term "bandwidth" is denoted BW and as the term is used herein is the modal bandwidth. For the multimode fibers in this application, the modal bandwidth is also referred to as effective bandwidth and is obtained/defined using the encircled flux launch condition, which represents a standard compliant launch condition, as discussed further below, and is used to gauge the bandwidth capability of the fiber under study.

In the discussion below, the core of the multimode optical fiber disclosed herein may be referred to as the "core region" and the fiber cladding and its inner, intermediate and outer regions may be referred to as the cladding region, inner cladding region, intermediate cladding region, and outer cladding region to distinguish from corresponding regions or sections of a preform used to form the co-doped wideband multimode optical fiber.

Reference will now be made in detail to illustrative embodiments of the present description.

Figure 2:
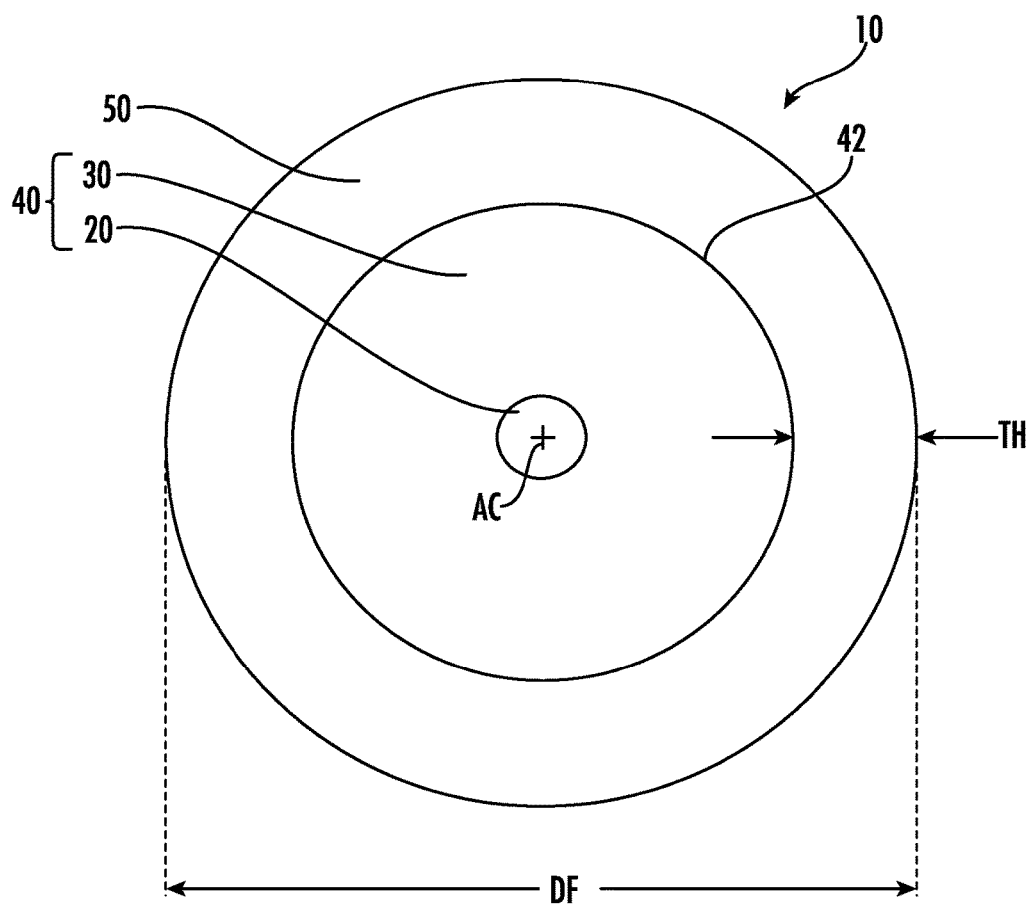
FIG. 2 is a cross-sectional view of the exemplary multimode optical fiber of FIG. 1.

FIG. 1 is a front-end isometric view of an exemplary wideband multimode optical fiber 10 as disclosed herein, while FIG. 2 is a cross-sectional view of fiber 10. As shown in FIGS. 1 and 2, optical fiber 10 has a centerline AC, a core region 20, and a cladding region 30 that immediately surrounds core region 20. Both core region 20 and cladding region 30 are made of glass and define a glass section 40, which has an outer surface 42 (as shown in FIG. 2).

Fiber 10 also comprises a protective coating 50 that immediately surrounds outer surface 42 of glass section 40. Protective coating 50 can comprise two or more layers of different polymeric materials, such as, for example, acrylate. In some embodiments, protective coating 50 comprises a low modulus primary coating and a high modulus secondary coating. As shown in FIG. 2, protective coating 50 has a thickness TH, and an outer diameter of protective coating 50 defines a fiber diameter DF of fiber 10. In one exemplary embodiment, core region has 20 has a diameter of about 100 microns, glass section 40 has a diameter of about 125 microns, the fiber diameter DF is about 250 microns, and the thickness TH of protective coating 50 is about 62.5 micron.

Figure 3:
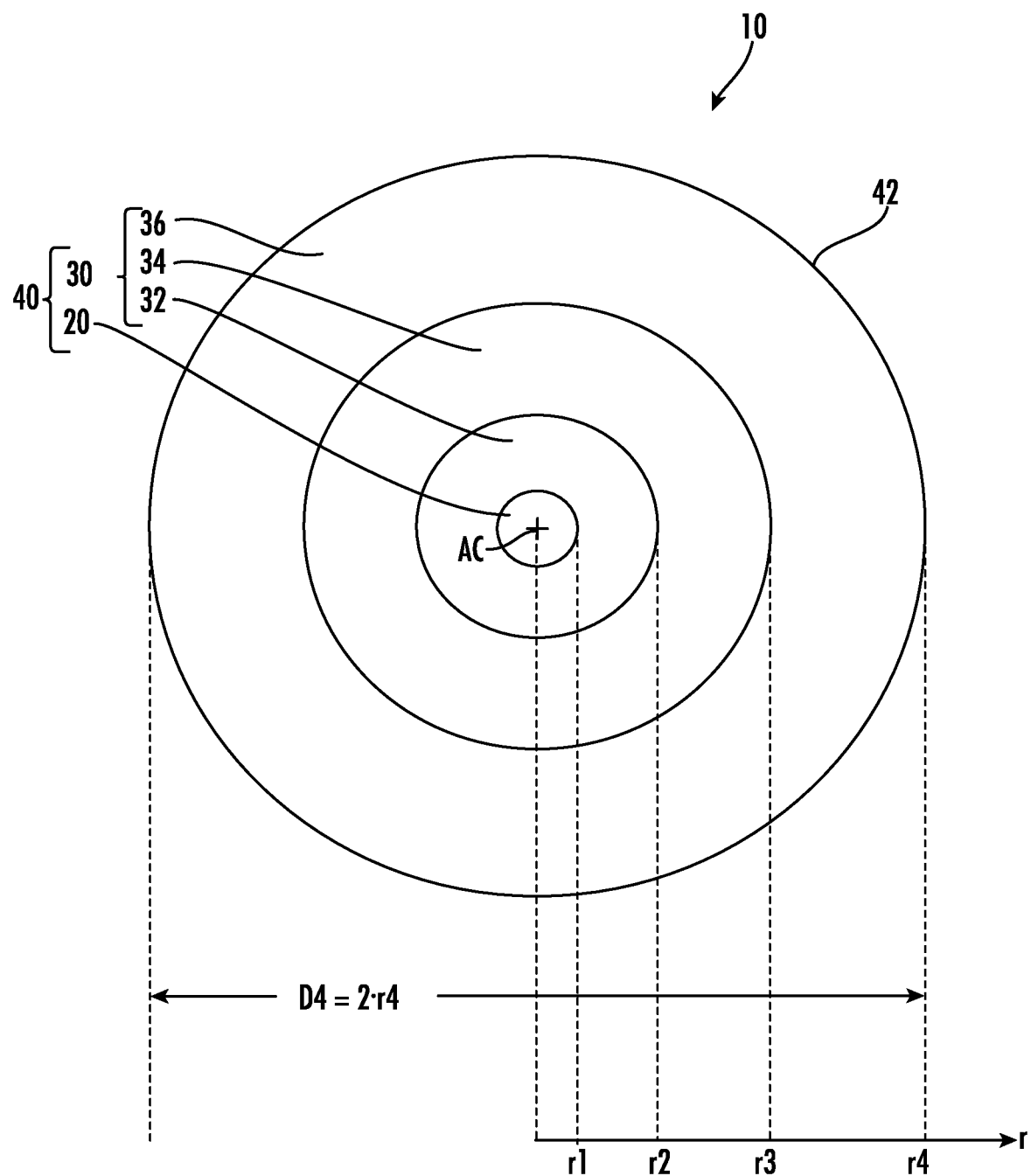
FIG. 3 is a close-up cross-sectional view of the glass section of the exemplary multimode optical fiber of FIGS. 1 and 2.

FIG. 3 is a cross-sectional view of glass section 40 of fiber 10 (i.e., fiber 10 without protective coating 50). As shown in FIG. 3, core region 20 has an outer radius $r_1$. Cladding region 30 surrounds and is disposed directly adjacent to core region 20 and comprises an inner cladding region 32, having an outer radius $r_2$, an intermediate cladding region 34, having an outer radius $r_3$, and an outer cladding region 36, having an outer radius $r_4$. It is also noted that outer radius $r_4$ is also the outer radius of cladding region 30 and of glass section 40. The diameter of cladding region 30 and of glass section 40 is $D4 = 2 \cdot r_4$. In some embodiments, the diameter of glass section 40 is about 100 microns or greater, or about 125 microns or greater, or about 150 microns or greater, or about 175 microns or greater, or about 200 microns or greater, or about 225 microns or greater, or about 250 microns or greater, or about 275 microns or greater, or about 300 microns or greater, or about 325 microns or greater, or about 350 microns or greater, or about 375 microns or greater, or about 400 microns or greater.

It is also contemplated, as discussed further below, that cladding region 30 does not comprise one or more of inner cladding region 32, intermediate cladding region 34, and outer cladding region 36. For example, in some embodiments, cladding region 30 may only comprise inner cladding region 32 and intermediate cladding region 34 and may not include outer cladding region 36. In this embodiment, intermediate cladding region 34 may extend from the outer radius of inner cladding region 32 ($r_2$) to the outer radius of cladding region 30 ($r_4$) (so that the outer radius of intermediate cladding region 34 forms outer surface 42 of glass section 40). In another embodiment, cladding region 30 may only comprise intermediate cladding region 34. In this embodiment, intermediate cladding region 34 surrounds and is directly adjacent to core region 20 and intermediate cladding region 34 extends from the outer radius of core region 20 ($r_1$) to the outer radius of cladding region ($r_4$) (so that the outer radius of intermediate cladding region 34 forms outer surface 42 of glass section 40).

In some embodiments, cladding region 30 does not comprise an up-dopant. Thus, in these embodiments, the entirety of cladding region 30 is free of up-dopants. However, in these embodiments, cladding region 30 may still comprise one or more down-dopants.

In some other embodiments, optical fiber 10 does not comprise a cladding region 30. Thus, in these embodiments, glass section 40 is only formed of core region 20, and the outer radius of core region 20 forms outer surface 42 of glass section 40.

Figure 4:
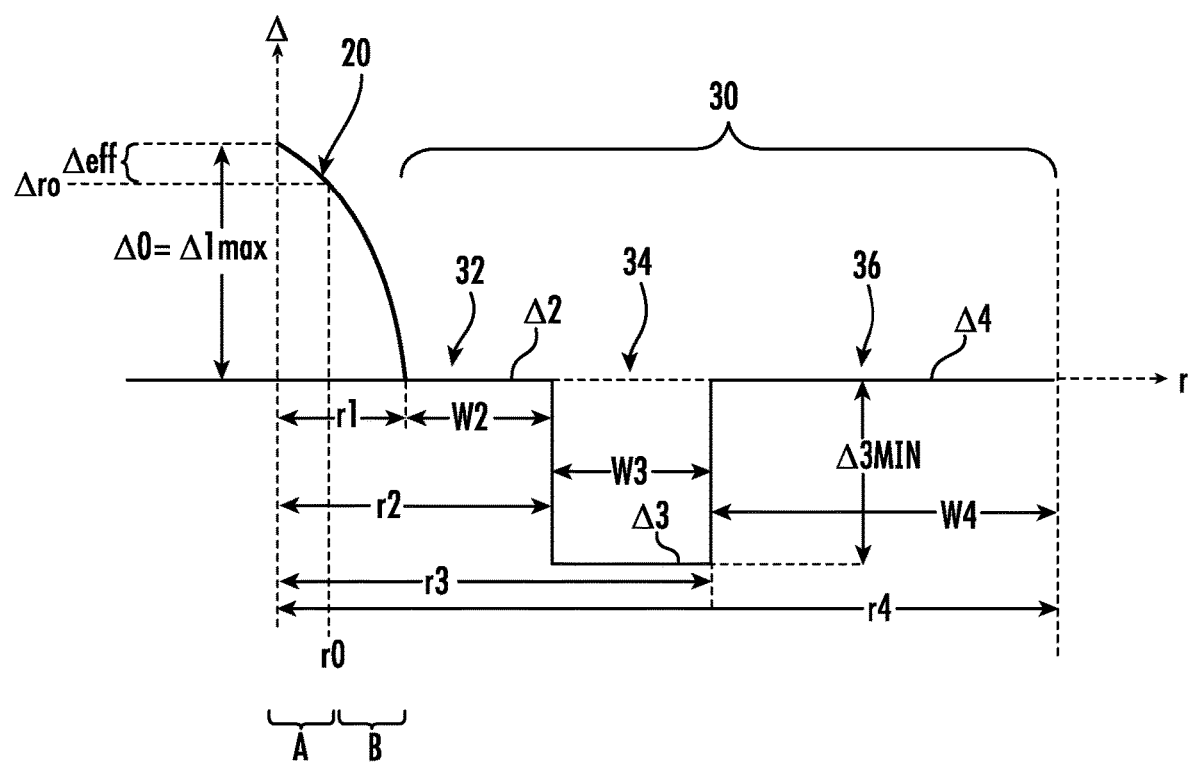
FIG. 4 is an exemplary relative refractive index profile of a multimode optical fiber, according to embodiments disclosed herein, as a plot of the relative refractive index Δ versus the radial coordinate r.

FIG. 4 plots an idealized relative refractive index profile of fiber 10 as the relative refractive index $\Delta$ versus the radial coordinate r. Core region 20 has relative refractive index $\Delta 1(r)$, with a maximum refractive index of $\Delta_0 = \Delta 1_{MAX}$ at r=0 and a gradient α-profile, which is described in greater detail below. Inner cladding region 32 has a relative refractive index $\Delta_2$ and a width $W_2$. Intermediate cladding region 34 can be in the form of a depressed region or a trench and has a width $W_3$ and a relative refractive index $\Delta_3 < \Delta_2$, with a minimum value $\Delta_{3MIN}$. Outer cladding region 36 has a width $W_4$ and relative refractive index $\Delta_4$, which is shown by way of example as $\Delta_2 = \Delta_4$. Other configurations for the relative refractive index profile are discussed further below.

Core Region

Core region 20 comprises silica glass that is either undoped or up-doped silica glass. Up-doped silica glass includes silica glass doped with, for example, germanium (e.g., $GeO_2$), phosphorus (e.g., $P_2O_5$), aluminum (e.g. $Al_2O_3$), or chlorine. In some embodiments, the concentration of the germanium up-dopant in core region 20 may be in a range from about 10 wt % to about 40 wt %, or in the range from about 15 wt % to about 35 wt %, or in the range from about 20 wt % to about 30 wt %.

As discussed above, the relative refractive index of core region 20 of the glass fiber is described by an α-profile with an α value that is in a range of about 0.9 to about 2.6, about 0.9 to about 2.3, about 1.5 to about 2.6, about 1.6 to about 2.5, about 1.7 to about 2.4, about 1.8 to about 2.3, about 1.9 to about 2.3, about 1.9 to about 2.2, or about 2.0 to about 2.1, as measured at 850 nm.

The outer radius $r_1$ of core region 20 is in a range from about 20 microns or greater, about 25 microns or greater, about 30 microns or greater, about 35 microns or greater, about 40 micron or greater, about 45 microns or greater, about 50 microns or greater, about 55 microns or greater, or about 60 microns or greater. Additionally or alternatively, the radius $r_1$ of core region 20 is in a range from about 70 microns or less, about 65 microns or less, about 60 microns or less, or about 50 microns or less. In some embodiments, the outer radius $r_1$ is in a range from about 25 microns to about 50 microns, or about 30 microns to about 65 microns, or about 30 microns to about 62.5 microns, or about 45 microns to about 55 microns, or about 50 microns, or about 62.5 microns. As discussed above, the outer radius $r_1$ of core region 20 is greater than compared with traditional multimode optical fibers.

The maximum relative refractive index $\Delta_0$ or $\Delta_{1max}$ of core region 20 is about 3.0% or less, or about 2.5% or less, or about 2.0% or less, or about 1.5% or less, or about 1.0% or less, or about 0.5% or less. Additionally or alternatively, the maximum relative refractive index of core region 20 is about 0.2% or greater, or about 0.5% or greater, or about 0.7% or greater, or about 0.9% or greater. In some embodiments, the maximum relative refractive index of core region 20 is in a range from about 0.3% to about 0.95%, or about 0.5% to about 2.0%, or about 0.5% to about 0.8%, or about 0.6% to about 1.7%, or about 0.7% to about 1.5%, or about 0.8% to about 1.2%, or about 0.3% to about 0.95%. For example, the maximum relative refractive index may be about 1.0%, or about 0.80%, or about 0.75%, or less than 1.0%.

Although not depicted in FIG. 4, in some embodiments, the refractive index of core region 20 may have a centerline dip such that the maximum relative refractive index of core region 20 and the maximum relative refractive index of the entire optical fiber 10 is located a small distance away from the centerline of core region 20 rather than at the centerline of core region 20, as depicted in FIG. 4.

Inner Cladding Region

Inner cladding region 32 may be comprised of undoped silica glass. The inner radius of inner cladding region 32 is $r_1$, as discussed above. The outer radius $r_2$ of inner cladding region 32 is in a range from about 30 microns or greater, or about 40 microns or greater, or about 45 microns or greater, or about 50 microns or greater, or about 55 microns or greater, or about 60 microns or greater. Additionally or alternatively, the outer radius $r_2$ of inner cladding region 32 is in a range from about 70 microns or less, or about 65 microns or less, or about 60 microns or less, or about 55 microns or less, or about 50 microns or less.

The relative refractive index 42 of inner cladding region 32 is in a range from about −0.20% to about 0.20%, or in a range from about −0.15% to about 0.15%, or in a range from about −0.10% to about 0.10%, or in a range from about −0.05% to about 0.05%. In some embodiments, the relative refractive index 42 is about 0.0%. The relative refractive index 42 is preferably constant or approximately constant.

As discussed above, it is also contemplated, in some embodiments, that cladding region 30 does not comprise an inner cladding region 32.

Intermediate Cladding Region

Intermediate cladding region 34 comprises down-doped silica glass. In some embodiments, intermediate cladding region 34 is down-doped with fluorine. However, the down-doping of intermediate cladding region 34 can also be accomplished by incorporating voids in silica glass. Voids correspond to localized regions filled with air or other gas (e.g. $N_2$, Ar, $SO_2$, $CO_2$, Kr, $O_2$) and/or evacuated spaces that extend for a length less than the full length of the glass fiber. The voids are preferably distributed randomly or non-periodically along the length of the glass fiber.

The inner radius of intermediate cladding region 34 is $r_2$, as discussed above. The outer radius $r_3$ of intermediate cladding region 34 is in a range of about 35 microns or greater, or about 45 microns or greater, or about 55 microns or greater, or about 60 microns or greater, or about 62.5 microns or greater, or about 65 microns or greater. Additionally or alternatively, the outer radius $r_3$ is in a range of about 70 microns or less, or about 65 microns or less, or about 60 microns or less. In some embodiments, the outer radius $r_3$ is about 62.5 microns. The width W3 of intermediate cladding region 34 may be between about 1 micron and about 15 microns, or between about 2 microns and about 10 microns, or between about 3 microns and about 8 microns, or between about 4.5 microns and about 5.5 microns.

In some embodiments, intermediate cladding region 34 is a depressed-index cladding region that forms a trench design. The trench design may be an offset trench. The relative refractive index 43 of intermediate cladding region 34 is in a range from about −0.70% to about −0.10%, or about −0.60% to about −0.20%, or about −0.55% to about −0.25%, or about −0.50% to about −0.30%, or about −0.45 to about −0.35%. In some embodiments, the relative refractive index $\Delta_3$ is about −0.40%.

The transition regions from inner cladding region 32 to intermediate cladding region 34 and from intermediate cladding region 34 to outer cladding region 36 are shown as step changes in FIG. 4. However, it is to be understood that a step change is an idealization and that transition regions may not be strictly vertical in practice. Instead, the transition regions may have a slope or curvature.

A trench volume of intermediate cladding region 34 may be about 100% $\Delta$-micron$^2$ to about 500% $\Delta$-micron$^2$, or about 150% $\Delta$-micron$^2$ to about 450% $\Delta$-micron$^2$, or about 200% $\Delta$-micron$^2$ to about 400% $\Delta$-micron$^2$.

The trench designs of intermediate cladding region 34, as disclosed herein, provide advantages over traditional designs. For example, the trench designs disclosed herein advantageously confine the intensity profiles of the higher order modes propagating through an outer core portion of the optical fiber, thereby reducing the loss of these modes due to bending and other perturbations. In addition, by placing the location of the trench at an optimal offset from the core region, the trench can help reduce differential mode delays for the outer mode groups, resulting in higher bandwidth. The offset of the trench from core region 20 ($r_2$-$r_1$) is between about 0.0 microns to about 6.0 microns, or about 0.5 microns to about 5.0 microns, or about 1.0 micron to about 4.0 microns, or about 1.5 microns to about 2.5 microns.

As discussed above, it is also contemplated, in some embodiments, that cladding region 30 does not comprise an intermediate cladding region 34.

Outer Cladding Region

Similar to inner cladding region 32, outer cladding region 36 may also comprise undoped silica glass. The inner radius of outer cladding region 36 is $r_3$, as discussed above. The outer radius $r_4$ of outer cladding region 36 is in a range from about 55 microns or greater, or about 60 microns or greater, or about 65 microns or greater. Additionally or alternatively, the outer radius $r_4$ of outer cladding region 36 is in a range from about 90 microns or less, or about 80 microns or less, or about 75 microns or less, or about 70 microns or less, or about 65 microns or less. In some embodiments, the outer radius $r_4$ is about 62.5 microns.

The relative refractive index $\Delta_4$ of outer cladding region 36 is in a range from about –0.20% to about 0.20%, or in a range from about –0.15% to about 0.15%, or in a range from about –0.10% to about 0.10%, or in a range from about –0.05% to about 0.05%. In some embodiments, the relative refractive index 44 is about 0.0%. The relative refractive index 44 is preferably constant or approximately constant. Furthermore, in some embodiments, the relative refractive index 44 is equal to or substantially equal to the relative refractive index 42.

As discussed above, it is also contemplated, in some embodiments, that cladding region 30 does not comprise an outer cladding region 36.

Exemplary Optical Fiber

Figure 5:
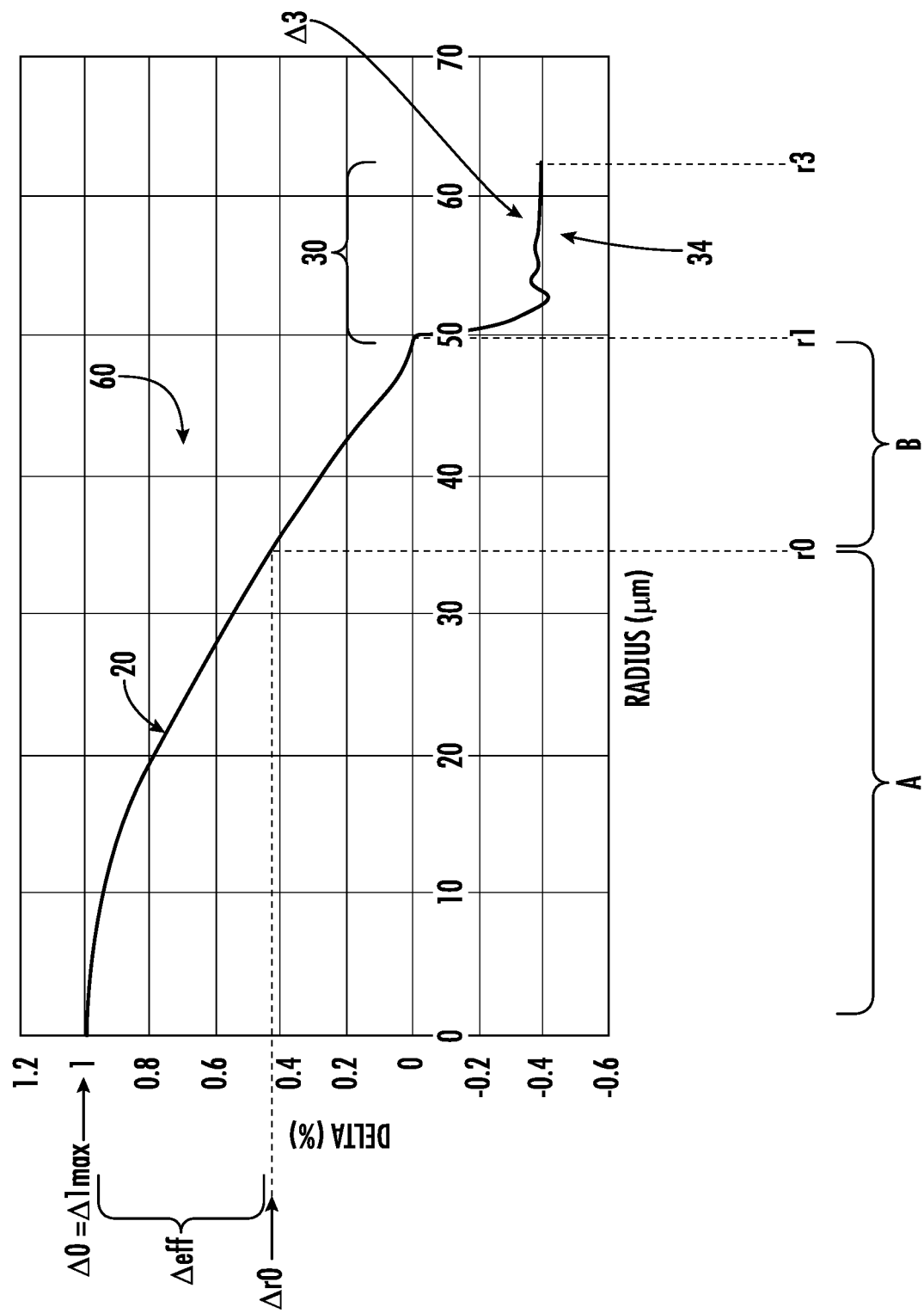
FIG. 5 is another exemplary relative refractive index profile of a multimode optical fiber, according to embodiments disclosed herein, as a plot of the relative refractive index Δ versus the radial coordinate r.
Figure 6A:
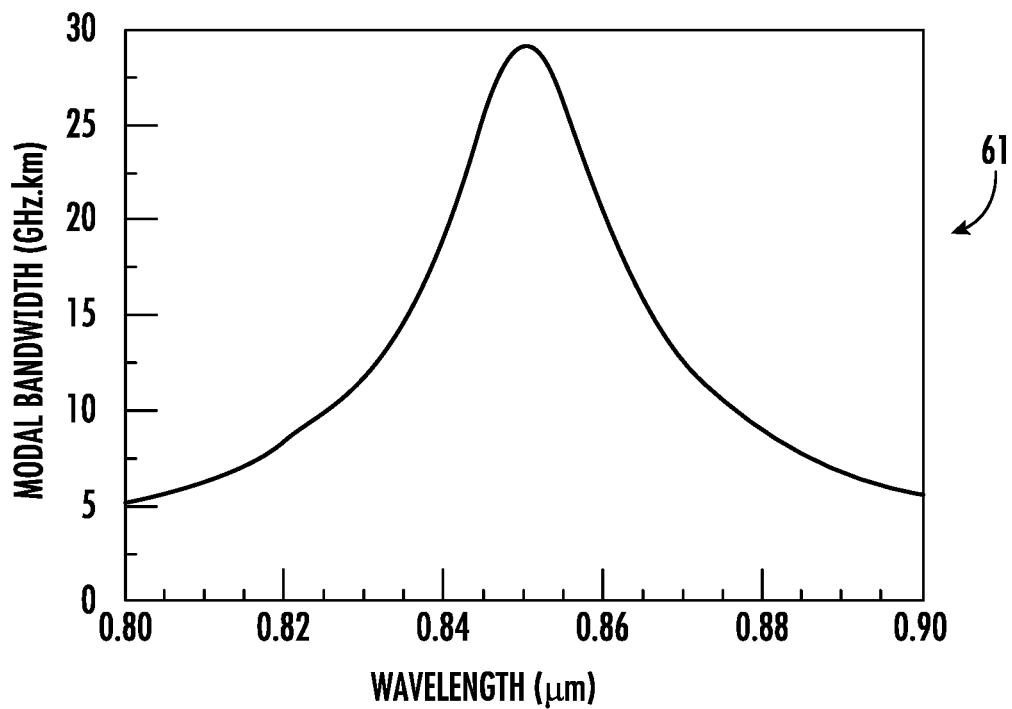
FIGS. 6A-6D are plots of effective bandwidth vs. wavelength for multimode optical fibers, according to embodiments disclosed herein.
Figure 6B:
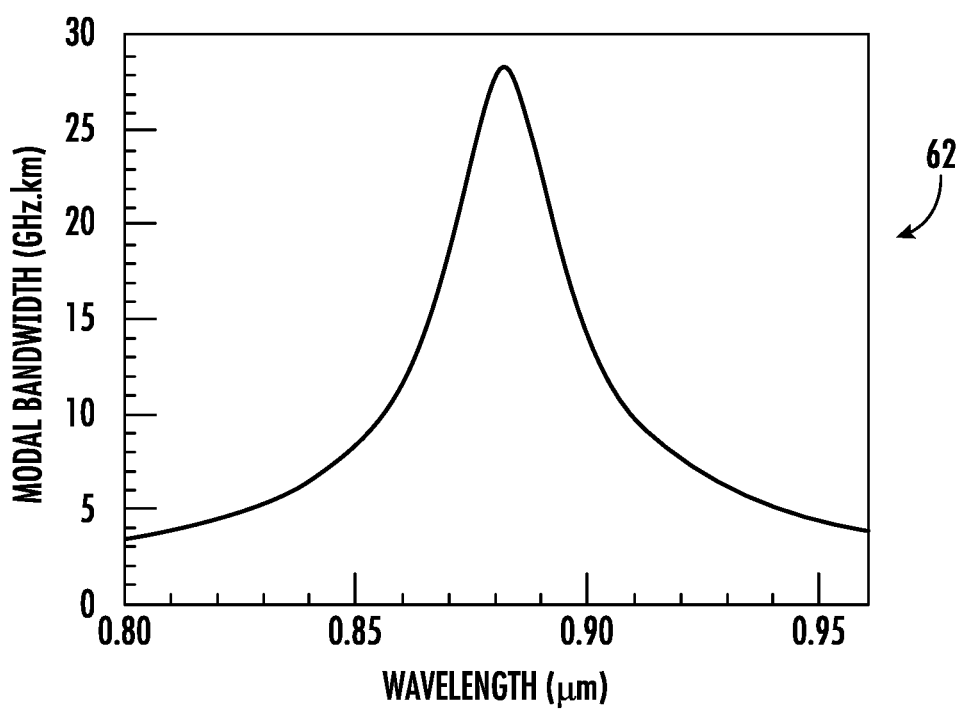
Figure 6C:
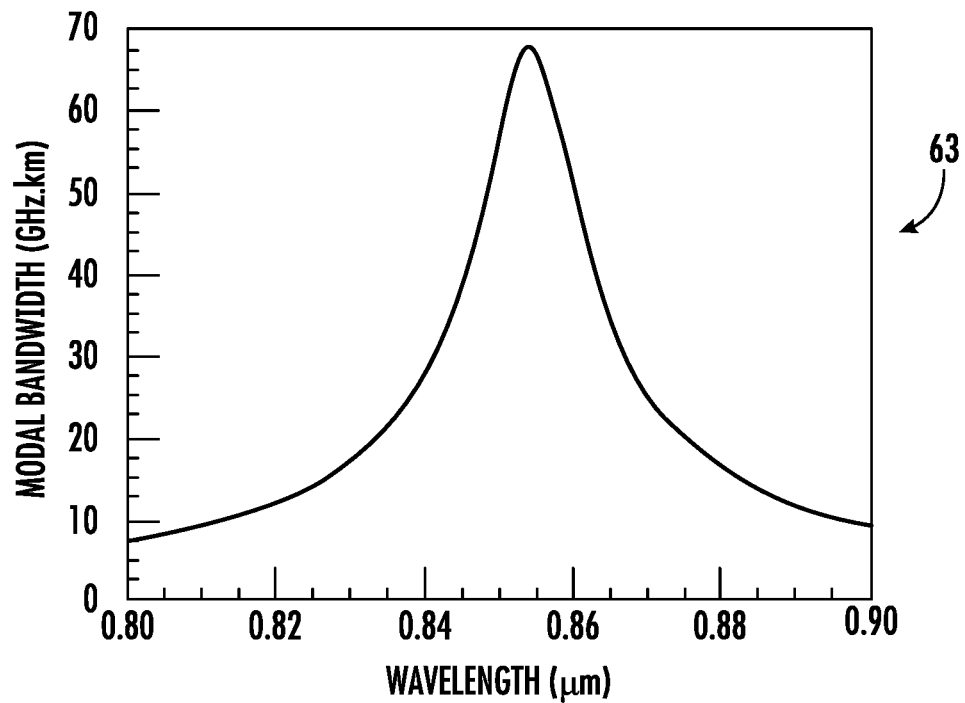
Figure 6D:
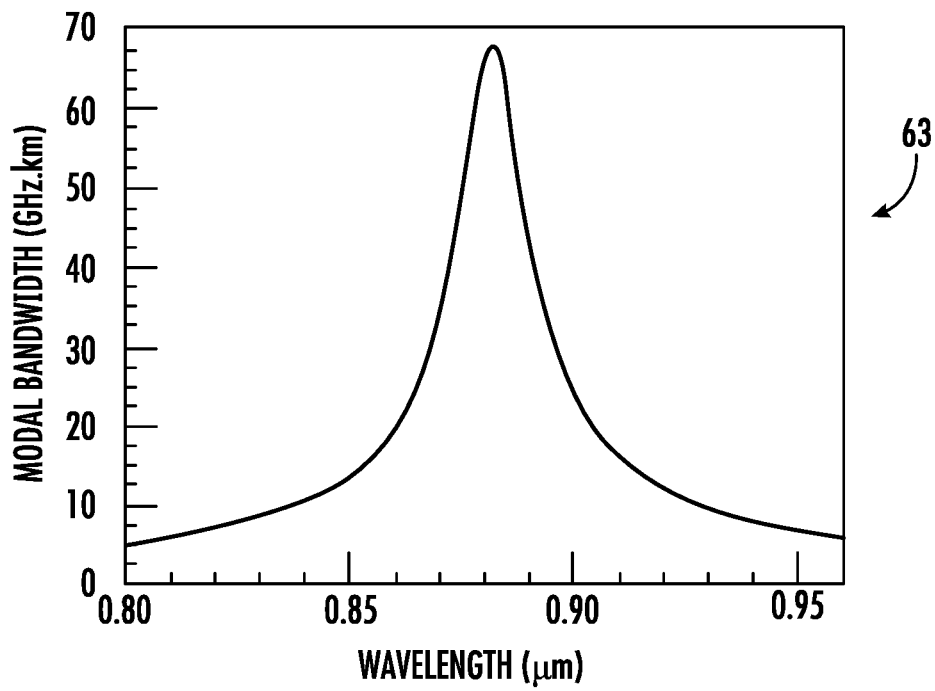

FIG. 5 plots a relative refractive index profile of an exemplary optical fiber 60 as the relative refractive index Δ % versus the radial coordinate r, according to embodiments disclosed herein. As shown in FIG. 5, core region 20 of exemplary optical fiber 60 has a maximum relative refractive index $\Delta_0$ or $\Delta_{1max}$ of 1.0%, an outer radius $r_1$ of 50 microns, and an alpha (α) value of 2.1. Cladding region 30 of exemplary optical fiber 60 only includes intermediate cladding region 34 and does not include either inner cladding region 32 or outer cladding region 36. As shown in FIG. 5, intermediate cladding region 34 has a relative refractive index 43 of about –0.38% and an outer radius $r_3$ of 62.5 microns. The outer radius of intermediate cladding region 34, in the embodiment of FIG. 5, is the outer radius of exemplary optical fiber 60 (without a protective coating). Intermediate cladding region 34, in the embodiment of FIG. 5, is a depressed trench region that is down-doped with fluorine and has a trench volume of 460% Δ-micron².

In the embodiment of FIG. 5, cladding region 30 of exemplary optical fiber 60 is free of any up-dopants.

Relative Refractive Index of the Core Region

Optical fiber 10, as disclosed herein, may be used with traditional encircled flux launch conditions, such as VCSEL launch conditions, providing a 50 micron radial Gaussian laser light. The TIA-526-14-B and IEC 61280-4-1 Ed. 2.0 encircled flux standards define parameters of multimode launch conditions for optical test sources. Manufacturers produce equipment, such as the MC-FC-50-N ModCon® from Arden Photonics, which converts an output from any launch source into an encircled flux launch that meets the above standards. In the embodiments disclosed herein, the encircled flux launch condition is set so that the condition excites a traditional 50 micron core diameter multimode fiber with 86% power at a radius of 19 microns, when starting from the center of the fiber.

Therefore, in some embodiments disclosed herein, less than an entirety of the diameter of optical fiber 10 is excited when excited with the encircled flux launch condition described above. As discussed above, core region 20 comprises a larger outer radius compared with traditional multimode optical fibers. In some embodiments, the outer radius $r_1$ of core region 20 is about 1.15×, about 1.25×, about 1.40×, about 1.5×, about 1.65×, about 1.75×, about 1.9×, about 2.0×, about 2.15×, about 2.25×, about 2.40×, or about 2.50× greater than the outer radius of a traditional 50 micron core diameter multimode optical fiber. Due to its increased size, in some embodiments, less than an entirety of core region 20 is excited with the encircled flux launch condition Therefore, the excited portion of core region 20 has a reduced effective relative refractive index $\Delta_{eff}$ that is less than the maximum relative refractive index $\Delta_0$ of core region 20. Accordingly, and as discussed further below, the reduced effective relative refractive index $\Delta_{eff}$ causes the effective bandwidth, of the excited portion of core region 20, to increase significantly.

As used herein, the effective relative refractive index $\Delta_{eff}$ refers to the difference between the maximum relative refractive index $\Delta_0$ and the relative refractive index $\Delta_m$ of the portion of core region 20 that is excited by the laser light, under the encircled flux launch condition. Thus, the effective relative refractive index $\Delta_{eff}$ is bound by the maximum relative refractive index $\Delta_0$ and the relative refractive index $\Delta_{r0}$. Furthermore, the relative refractive index $\Delta_{r0}$ is defined by the radius of the optical etendue from the encircled flux launch condition. As shown in FIG. 5, this radius is the effective radius $r_0$, which corresponds to the radius of the excited portion of core region 20.

Traditional multimode optical fibers have a core region with a reduced diameter, as compared with the multimode optical fibers disclosed herein. Thus, when traditional multimode optical fibers are excited with, for example, the encircled flux launch condition described above, the bulk (entirety) of the core is excited. Therefore, in these traditional multimode optical fibers, the effective relative refractive index $\Delta_{eff}$ of the excited portion of the core region is essentially the same as the maximum relative refractive index $\Delta_0$ (so that $\Delta_{eff}$ is equal to $\Delta_0$, $\Delta_{r0}$ is equal to zero, and $r_0$ is equal to $r_1$).

However, in the embodiments of the present disclosure, core region 20 has a relatively larger diameter than the traditional multimode optical fibers. Thus, only a portion of core region 20, which is less than the entire diameter of core region 20, is excited when used with the encircled flux launch condition described above. Therefore, a portion of core region 20 is not excited. For example, a radially center portion of core region 20 may be excited and radially outer, peripheral portions of core region 20 may not be excited. As shown in FIGS. 4 and 5, portion A of core region 20 is excited and portion B of core region 20 is not excited by the encircled flux launch condition described above. Accordingly, in the embodiments of the present disclosure, the maximum relative refractive index $\Delta_0$ of core region 20 is greater than the effective relative refractive index $\Delta_{eff}$ of the excited core portion of core region 20, and the radius $r_1$ of core region 20 is greater than the effective radius $r_0$ of the excited core portion of core region 20.

As also shown in FIGS. 4 and 5, $r_1$ refers to the outer radius of core region 20 and $r_0$ refers to the effective radius of the excited portion of core region 20, as discussed above. During the encircled flux launch condition, after the light is launched into the large core multimode fibers of the present disclosure, $r_0$ is greater than the radius of the laser light of the encircled flux launch condition. The laser light of the encircled flux launch condition illuminates a larger portion of core region 20 than the diameter of the laser light itself due to the preservation of the optical etendue. Therefore, when using the encircled flux launch condition, the excited portion of core region 20 (portion A) may have an effective radius $r_0$ that is greater than the radius of the laser light. For example, the effective radius $r_0$ is greater than 25 microns when the laser light has a radius of 25 microns. The effective radius $r_0$ of the excited portion of core region 20 may be selected such that the optical etendue of the excited portion of the core region from the encircled flux launch condition is substantially the same as the optical etendue of a standard multimode fiber with a core diameter of 50 micron and a core delta of 1%. In some embodiments, the optical etendue of the excited portion of the core region is between about 80 micron$^2$ and about 180 micron$^2$. Therefore, as discussed above, the optical etendue from the encircled flux launch condition excites less than the entire core region of the multimode optical fiber. The optical etendue is calculated according to Equation (1) below:

$$E = \frac{\pi^2}{4}\left(\frac{\alpha}{\alpha+2}\right)D^2 n_0^2 \Delta_0 \qquad (1)$$

where E is the optical etendue of the fiber, no is the refractive index in the core center, $\Delta_0$ is the is the maximum relative refractive index of the core region, a is the refractive index profile shape parameter for the core region, and D is the core diameter. Equation 1 shows that one can decrease the delta ($\Delta_0$) and increase the core diameter (D) to keep the same etendue. For a 50 micron core multimode fiber with 1% delta, the optical etendue is about 130 micron$^2$. For a multimode fiber with a core diameter larger than 50 microns, the effective radius $r_0$ of the excited portion of the core region is smaller than the outer radius $r_1$ of the core region to provide an optical etendue substantially equal to about 130 micron$^2$, or in the range between about 80 micron$^2$ and about 180 micron$^2$.

However, it is also contemplated in some embodiments, that the outer radius $r_1$ of core region 20 and the effective radius $r_0$ of the excited portion of core region 20 are substantially equal when illuminated with the laser light of the encircled flux launch condition. Thus, in these embodiments, the optical etendue from the encircled flux launch condition excites the entire core region and portion B is substantially equal to 0.0 microns.

The relationship between the effective radius ($r_0$) of the excited portion of core region 20 with the outer radius ($r_1$) of core region 20 and the radius of the laser light of the encircled flux launch condition can be shown according to Equations (2) and (3) below, which are derived from the conservation of optical etendue. For transceivers designed for conventional 50 micron core diameter multimode fiber, its optical etendue of laser light can be estimated using the core delta and the core radius of a conventional 50 micron core diameter multimode fiber.

More specifically, Equation (2) calculates the relative refractive index $\Delta r_0$ of the excited portion of core region 20:

$$\Delta_{r_0} = \Delta_0[1-(r_0/r_1)^\alpha] \qquad (2)$$

and Equation (3) calculates the radius $r_0$ of the excited portion of core region 20:

$$r_0 = {}^{2+\alpha}\!\!\sqrt{r_{1c}^2 r_1^\alpha \frac{\Delta_{0c}}{\Delta_0}} \qquad (3)$$

where $r_0$ is the radius of the excited portion of the core region, $r_1$ is the outer radius of the core region, $r_{1c}$ is the radius of the conventional 50 micron core diameter multimode fiber (i.e., $r_{1c}$=25 microns), α is the refractive index profile shape parameter for the core region, $\Delta_0$ is the maximum relative refractive index of the core region, and $\Delta_{0c}$ is the maximum relative refractive index of the conventional 50 micron core diameter multimode fiber, which is about 1.0%.

The effective refractive index $\Delta_{eff}$ can then be calculated according to Eq. (4) below.

$$\Delta_{eff} = \Delta_0 - \Delta_{r_0} \qquad (4)$$

where $\Delta_0$ is the maximum refractive index of the core region and $\Delta_{r_0}$ is the refractive index at $r_0$ of the excited portion of the core region.

For example, as shown in FIG. 5, when launched with the encircled flux launch condition described above, exemplary optical fiber 60 has a radius $r_0$ of the excited portion of the core region 20 (portion A) of about 35 microns, a relative refractive index $\Delta_{r_0}$ of the excited portion of the core region 20 of about 0.53%, and an effective relative refractive index difference $\Delta_{eff}$ of about 0.47%. Thus, the relative refractive index $\Delta_{r_0}$ and the effective relative refractive index $\Delta_{eff}$ are each less than the maximum relative refractive index $\Delta_0$ of 1.0%.

In some embodiments, the relative refractive index $\Delta_{r_0}$ of the excited portion of core region 20 is determined by the threshold of integrated power, from the encircled flux launch condition, reaching about 100% or less, or about 95% or less, or about 90% or less, or about 85% or less, or about 80% or less, or about 75% or less, or about 70% or less, or about 65% or less, or about 60% or less. The relative refractive index $\Delta_{r_0}$ may be in a range from about 1.45% or less, or about 1.30%, or about 1.15% or less, or about 1.00% or less, or about 0.95% or less, or about 0.75% or less, or about 0.60% or less, or about 0.45% or less, or about 0.30% or less. In some embodiments, the relative refractive index $\Delta_{r_0}$ is about 0.35%, or about 0.38%, or about 0.45%, or about 0.48%, or about 0.55%, or about 0.58%, or about 0.65%, or about 0.68%. The effective relative refractive index $\Delta_{eff}$, as discussed above, is the difference between the maximum relative refractive index $\Delta_0$ and the relative refractive index $\Delta_{r_0}$ of the excited portion of the core region. In some embodiments, $\Delta_{eff}$ is in range from about 0.30% to about 0.80%, or about 0.35% to about 0.75%, or about 0.40% to about 0.70%, or about 0.45% to about 0.65%, or about 0.60% to about 0.62%, or about 0.50%, or about 0.55%, or about 0.60%.

The excited portion of core region 20 (e.g., portion A) may have a diameter that is equal to or less than the diameter of outer surface 42 of glass section 40. In some embodiments, the excited portion of core region 20 has a radius $r_0$ that is in a range from about 10 microns to about 55 microns, from about 15 microns to about 50 microns, from about 20 microns to about 45 microns, or from about 25 microns to about 35 microns. In some embodiments, the radius $r_0$ is about 25 microns or greater, or greater than about 25 microns, or greater than about 26 microns, or greater than about 27 microns, or greater than about 28 microns, or greater than about 29 microns, or greater than about 30 microns, or about 35 microns or greater, or about 35.5 microns or greater, or about 36.5 microns or greater, or about 37.5 microns or greater, or about 38.5 microns or greater, or about 39.5 microns or greater, or about 40 microns or greater. As shown in the exemplary embodiment of FIG. 5, the excited portion of core region 20 has a radius $r_0$ that is 35 microns. Thus, in the exemplary embodiment of FIG. 5, the excited portion of core region 20 has a diameter of 70 microns.

Effective Bandwidth of the Core Region

As discussed above, the reduced effective refractive index $\Delta_{eff}$ of the embodiments disclosed herein advantageously provides an increased effective bandwidth for optical fiber 10. The effective bandwidth is proportionally related to the effective refractive index $\Delta_{eff}$ such that as $\Delta_{eff}$ decreases, the effective bandwidth increases. As shown in Table 1 below, as the core diameter of the optical fibers of the present disclosure increases, the effective refractive index $\Delta_{eff}$ decreases (with other factors, including the launch conditions and the core delta, remaining constant), which causes the effective bandwidth of the fiber to increase. The effective bandwidth increases by a factor of $1/\Delta_{eff}^2$.

Table 1 below includes the fiber parameters of 20 exemplary optical fibers, according to embodiments of the present disclosure, and their effective bandwidths. It is noted, however, that each fiber may be associated with more than one effective bandwidth. During the manufacturing of fibers, there can be some variations in the produced fiber due to the specific manufacturing process used. Therefore, even fibers with the same design can have small variations in the produced fiber. These small variations may result in different effective bandwidths for the fibers. This concept is further discussed with reference to FIG. 9A below.

TABLE 1

| Exemplary Fiber | Core Delta (%) | Core Diameter (microns) | Effective Bandwidth (GHz · km) |
| --- | --- | --- | --- |
| Fiber 1 | 1 | 60 | 22.0 |
| Fiber 2 | 1 | 70 | 30.41 |
| Fiber 3 | 1 | 80 | 40.25 |
| Fiber 4 | 1 | 90 | 51.54 |
| Fiber 5 | 1 | 100 | 64.31 |
| Fiber 6 | 1.2 | 60 | 18.50 |
| Fiber 7 | 1.2 | 70 | 25.57 |
| Fiber 8 | 1.2 | 80 | 33.85 |
| Fiber 9 | 1.2 | 90 | 43.35 |
| Fiber 10 | 1.2 | 100 | 54.08 |
| Fiber 11 | 1.5 | 60 | 14.97 |
| Fiber 12 | 1.5 | 70 | 20.69 |
| Fiber 13 | 1.5 | 80 | 27.38 |
| Fiber 14 | 1.5 | 90 | 35.07 |
| Fiber 15 | 1.5 | 100 | 43.75 |
| Fiber 16 | 0.8 | 60 | 27.19 |
| Fiber 17 | 0.8 | 70 | 37.59 |
| Fiber 18 | 0.8 | 80 | 49.75 |
| Fiber 19 | 0.8 | 90 | 63.71 |
| Fiber 20 | 0.8 | 100 | 79.49 |

As shown in Table 1 above, the effective bandwidth of the optical fibers increases as the core diameter increases. In the example of FIG. 5, the effective bandwidth increases by a factor of 4.3, as compared to a traditional 50 micron core diameter multimode fiber.

For example, the excited portion of core region 20 has an effective bandwidth, of about 3.0 GHz-Km or greater, about 3.5 GHz-Km or greater, about 3.7 GHz-Km or greater, about 4.0 GHz-Km or greater, about 4.5 GHz-Km or greater, about 4.7 GHz-Km or greater, about 5.0 GHz-Km or greater, about 5.5 GHz-Km or greater, about 5.7 GHz-Km or greater, about 6.0 GHz-Km or greater, about 6.5 GHz-Km or greater, about 6.7 GHz-Km or greater, about 7.0 GHz-Km or greater, about 7.5 GHz-Km or greater, about 7.7 GHz-Km or greater, about 8.0 GHz-Km or greater, about 8.5 GHz-Km or greater, about 8.7 GHz-Km or greater, about 9.0 GHz-Km or greater, about 9.5 GHz-Km or greater, about 9.7 GHz-Km or greater, about 10.0 GHz-Km or greater, about 15 GHz-Km or greater, about 20 GHz-Km or greater, about 20 GHz-Km or greater, or about 25 GHz-Km or greater, or about 30 GHz-Km or greater, or about 35 GHz-Km or greater, or about or about 40 GHz-Km or greater.

It is noted that the above disclosed effective bandwidths are at any wavelength within the range of between about 800 and about 1370, or between about 800 nm and about 1100 nm, or between about 840 nm and about 950 nm, or between about 850 nm and about 940 nm, or between about 840 nm and about 1060 nm, or between about 850 nm and about 1060 nm, or between about 940 nm and about 1060 nm, or between about 1250 nm and about 1370 nm, or between about 1270 nm and about 1320 nm, or about 980 nm, or about 1060 nm, or about 1310 nm.

It is also noted that the disclosed effective bandwidths are provided for an excited portion of the core region (e.g., portion A) having a diameter greater than about 50 microns (such that $r_0$ is greater than 25 microns). In other embodiments, the disclosed effective bandwidths are provided for an excited portion of the core region having a diameter greater than about 55 microns, greater than about 60 microns, greater than about 65 microns, greater than about 70 microns, greater than about 75 microns, or greater than about 80 microns. Additionally or alternatively, the disclosed effective bandwidths are provided for an excited portion of the core region having a diameter less than about 90 microns, less than about 85 microns, less than about 80 microns, or less than about 75 microns. In some embodiments, the disclosed effective bandwidths are provided for an excited portion of the core region having a diameter of greater than 50 microns and less than or equal to about 80 microns, or about 70 microns, or about 75 microns.

Additional Exemplary Optical Fibers

In other embodiments, as discussed above, the optical etendue from the encircled flux launch condition excites the entire core region of the multimode optical fiber. Thus, portion B is substantially equal to 0.0 microns, $r_0$ is substantially equal to $r_1$, and $\Delta_{eff}$ is substantially equal to $\Delta 0$. In these embodiments, the high bandwidths disclosed above are achieved by providing a relatively lower maximum relative refractive index $\Delta_0$ of core region 20. For example, the maximum relative refractive index $\Delta_0$ may be about 1.0% or less, or less than about 1.0%, or less than about 0.90%, or less than about 0.80%. In some embodiments, the maximum relative refractive index $\Delta_0$ is in a range from about 0.3% to about 0.95%, or about 0.40% to about 0.85%, or about 0.60% to about 0.80%. For example, the maximum relative refractive index $\Delta_0$ may be about 0.80%, or about 0.75%, or about 0.65%, or about 0.50%.

By providing a lower maximum relative refractive index $\Delta_0$, these embodiments have a truncated core region, which lowers the consumption of the up-dopant (e.g., germanium) required to produce the core region. Therefore, the lower maximum relative refractive index $\Delta_0$ of these embodiments advantageously lowers manufacturing costs.

In these embodiments, the core radius is selected such that the optical etendue, from the encircled flux launch condition, has an area in a range of about 110 micron$^2$ to about 150 micron$^2$, or about 120 micron$^2$ to about 140 micron$^2$, or about 125 micron$^2$, or about 130 micron$^2$, or about 135 micron$^2$.

Furthermore, in these embodiments, the alpha value of core region 20 is in a range from about 1.5 to about 2.5, or about 1.9 to about 2.3, or about 2.0 to 2.2. In some embodiments, the alpha value is about 2.0, or about 2.1, or about 2.3.

Table 2 below provides exemplary optical fibers according to these additional embodiments of the present disclosure. Exemplary fibers 61-64 each have a truncated core region (lower $\Delta_0$) compared with exemplary optical fiber 60 above.

TABLE 2

| | $\Delta_1$ (%) | $r_1$ (microns) | $\Delta_2$ (%) | $r_2$ (microns) | $\Delta_3$ (%) | $r_3$ (microns) | $\Delta_4$ (%) | $r_4$ (microns) | α |
|---|---|---|---|---|---|---|---|---|---|
| Exemplary Fiber 61 | 0.75 | 29 | 0 | 30.8 | −0.4 | 35.8 | 0 | 62.5 | 2.099 |
| Exemplary Fiber 62 | 0.75 | 29 | 0 | 30.8 | −0.4 | 35.8 | 0 | 62.5 | 2.088 |
| Exemplary Fiber 63 | 0.5 | 35.5 | 0 | 37.9 | −0.4 | 42.9 | 0 | 62.5 | 2.099 |
| Exemplary Fiber 64 | 0.5 | 35.5 | 0 | 37.9 | −0.4 | 42.9 | 0 | 62.5 | 2.09 |

As shown in Table 2, exemplary fibers 61-64 all have an intermediate cladding region with a depressed trench design. As discussed above, the optical offset of the trench from the core ($r_2$-$r_1$) is optimized to manage high order modes (which can be affected by edge or ending of the alpha profile) so that the modal delays of the high order modes are aligned with those of the low order modes. In exemplary fibers 61 and 62, the optical offset of the trench from the core is about 1.8 microns. In exemplary fibers 63 and 64, the optical offset of the trench from the core is about 2.4 microns.

The modal bandwidths of exemplary fibers 61-64 are shown in FIGS. 6A-6D. It is again noted that the modal bandwidths of FIGS. 6A-6D are shown when the encircled flux launch condition excites the entire core region of the multimode optical fiber (or at least a majority of the entire core region). Exemplary fiber 61 reaches a peak modal bandwidth of about 29 GHz·km at 850 nm (0.85 microns), while exemplary fiber 62 reaches a peak bandwidth of about 28 GHz·km at 890 nm (0.89 microns). Furthermore, exemplary fiber 63 reaches a peak modal bandwidth of about 68 GHz·km at 850 nm (0.85 microns), and exemplary fiber 64 reaches a peak modal bandwidth of about 68 GHz·km at 890 nm (0.89 microns). Thus, the exemplary fibers may be optimized for different bandwidth ranges, depending on the user's needs.

Figure 7A:
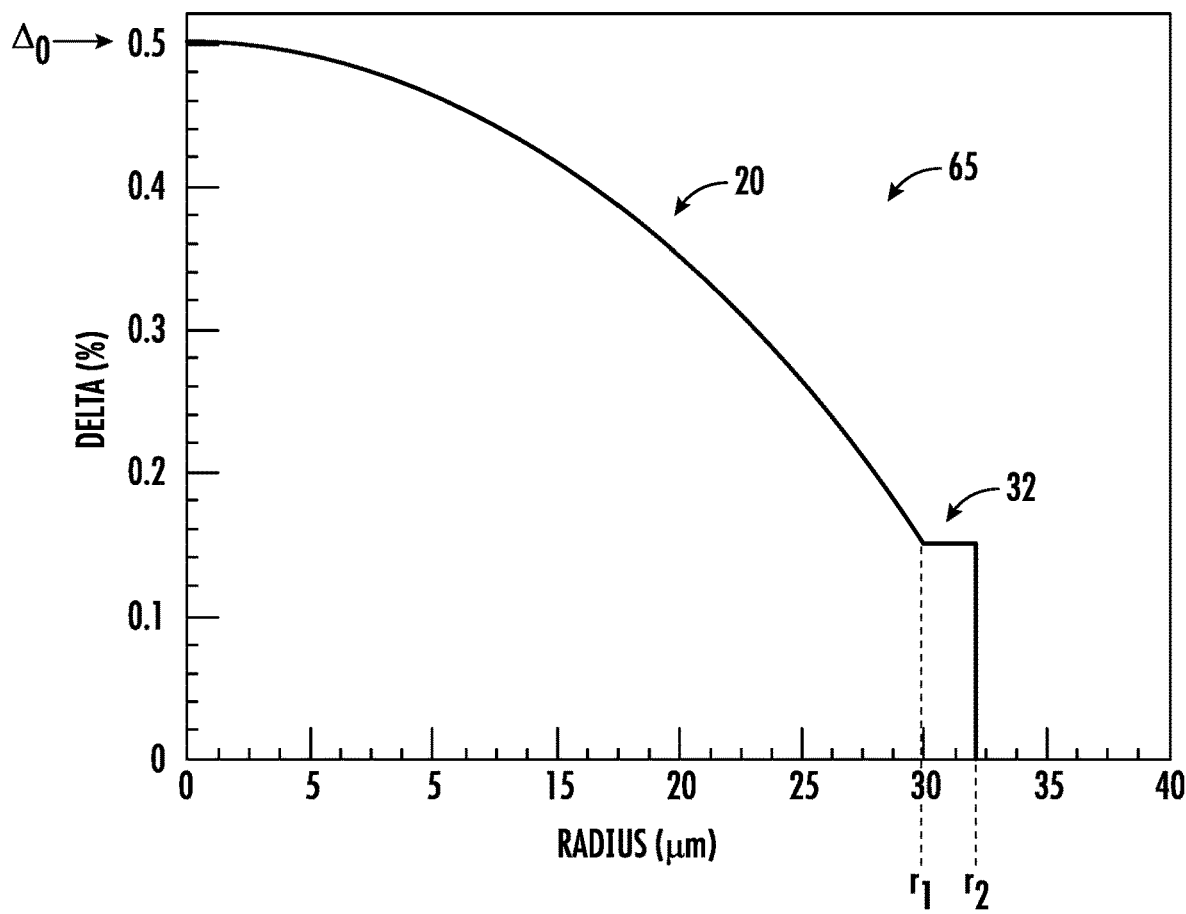
FIG. 7A is another exemplary relative refractive index profile of a multimode optical fiber, according to embodiments disclosed herein, as a plot of the relative refractive index Δ versus the radial coordinate r.

FIG. 7A provides a relative refractive index profile of an exemplary optical fiber 65 as the relative refractive index $\Delta$% versus the radial coordinate r, according to these additional embodiments disclosed herein. Similar to exemplary fibers 61-64, exemplary fiber 65 also has a truncated core region (lower $\Delta_0$). As shown in FIG. 7A, core region 20 of exemplary optical fiber 65 has a maximum relative refractive index $\Delta_0$ of 0.5%, an outer radius $r_1$ of 30.0 microns, and an α value of about 1.9 to about 2.3. Cladding region 30 of exemplary optical fiber 60 only includes inner cladding region 32 and does not include either intermediate cladding region 34 or outer cladding region 36. As shown in FIG. 7A, inner cladding region 32 has a relative refractive index $\Delta_2$ of 0.15% and an outer radius $r_2$ of 32.1 microns. Inner cladding region 32 in exemplary fiber 65 advantageously manages high order modes, which may be affected by edge or ending of the alpha profile, so that the modal delays of the high order modes are aligned with those of the low order modes.

Figure 7B:
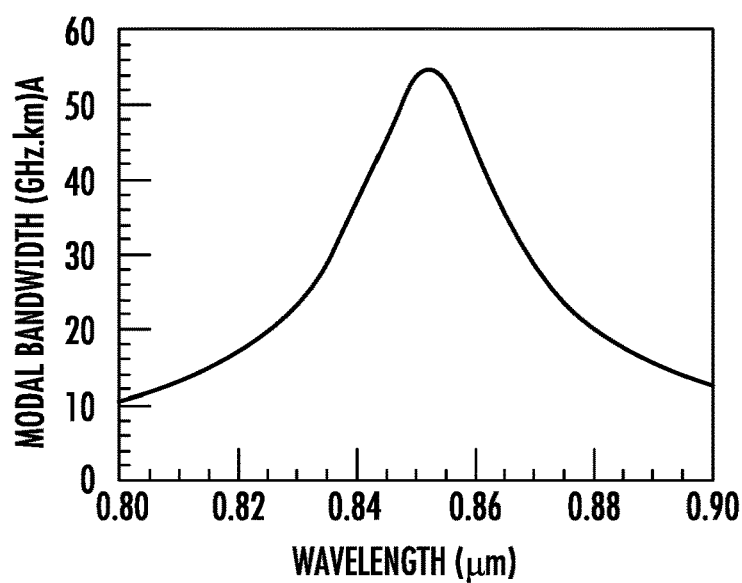
FIG. 7B is a plot of effective bandwidth vs. wavelength for the multimode optical fiber of FIG. 7A, according to embodiments disclosed herein.

The modal bandwidth of exemplary fiber 65 is shown in FIG. 7B. It is again noted that the modal bandwidth of FIG. 7B is shown when the encircled flux launch condition excites the entire core region of the exemplary fiber 65 (or at least a majority of the entire core region). Exemplary fiber 65 reaches a peak modal bandwidth of about 53 GHz·km at 850 nm (0.85 microns).

Fabricating the Optical Fiber

Figure 8:
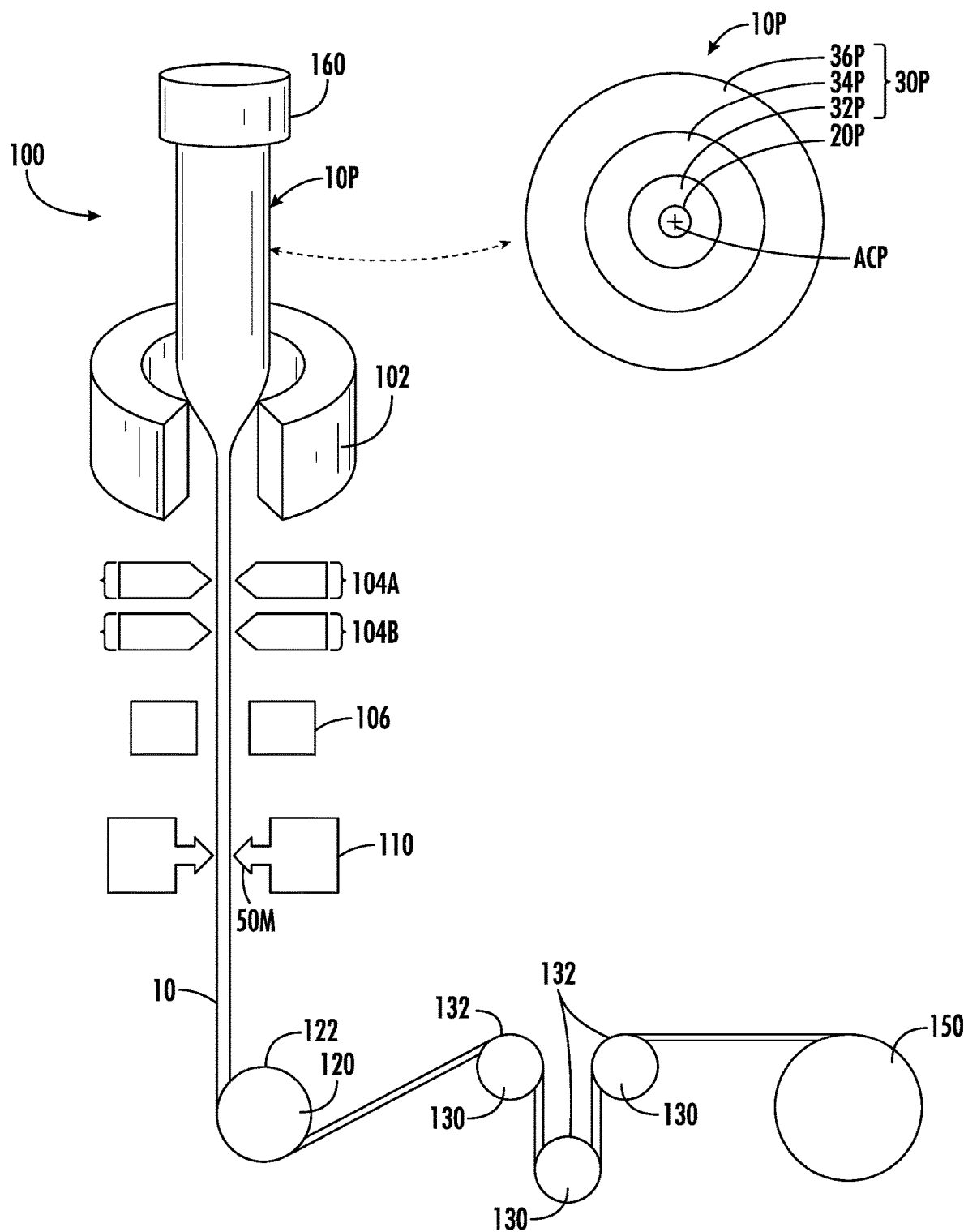
FIG. 8 is a schematic diagram of an exemplary optical fiber drawing system used to fabricate multimode optical fibers, according to embodiments disclosed herein.

Optical fiber 10 can be fabricated using standard optical fiber fabrication drawing techniques using a suitably fabricated glass preform 10P. FIG. 8 is a schematic diagram of an exemplary optical fiber drawing system ("drawing system") 100 used to fabricate optical fiber 10. As shown in FIG. 8, preform 10P includes a preform core region 20P and a preform cladding region 30P, which comprises a preform inner cladding region 32P, a preform intermediate cladding region 34P, and a preform outer cladding region 36P.

The drawing system 100 may comprise a draw furnace 102 for heating an end of preform 10P to its glass melt temperature (e.g., to about 2000° C.), non-contact measurement sensors 104A and 104B for measuring the size of the drawn optical fiber 10 as it exits the draw furnace (e.g., diameter control), a cooling station 106 to cool the drawn optical fiber 10, a coating station 110 that coats the drawn optical fiber 10 with a non-glass coating material 50M to form protective coating 50, a tensioner 120 to pull (draw) optical fiber 10, guide wheels 130 to guide the drawn optical fiber 10, and a fiber take-up spool ("spool") 150 to store the drawn optical fiber 10. Tensioner 120 has a surface 122 and guide wheels 130 have surfaces 132 over which the drawn optical fiber 10 passes. Drawing system 10 also includes a preform holder 160, which is located adjacent the top side of draw furnace 102 and holds the co-doped preform 10P used to form the co-doped fiber 10.

Tensioner 122 may pull (draw) optical fiber 10 with different drawing tensions, for example, about 30 g, about 35 g, about 40 g, about 45 g, about 50 g, about 55 g, about 60 g, about 65 g, about 70 g, about 75 g, about 80 g, about 85 g, about 90 g, about 95 g, about 100 g, about 105 g, about 110 g, about 115 g, or about 120 g. The drawing tension of tensioner 120 may be varied and/or adjusted to provide an optimal effective bandwidth at a specific wavelength for the drawn optical fiber 10.

Exemplary Properties

Figure 9A:
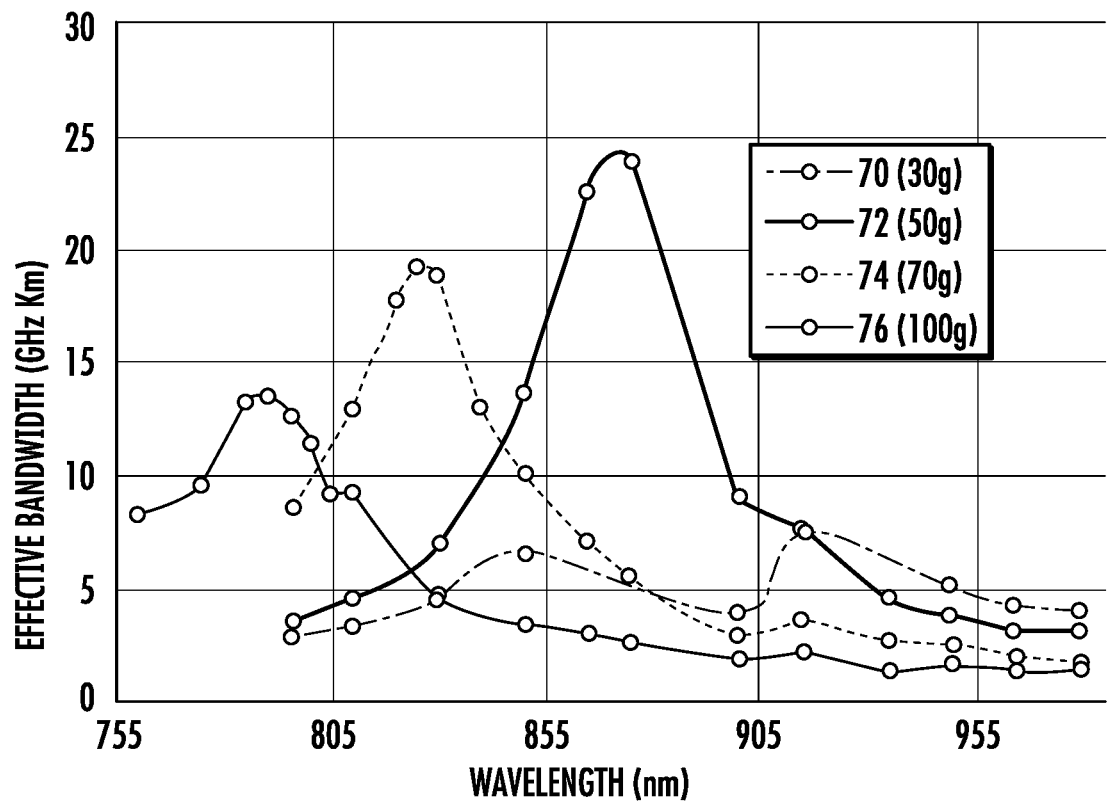
FIG. 9A is a plot of effective bandwidth vs. wavelength for multimode optical fibers, according to embodiments disclosed herein.
Figure 9B:
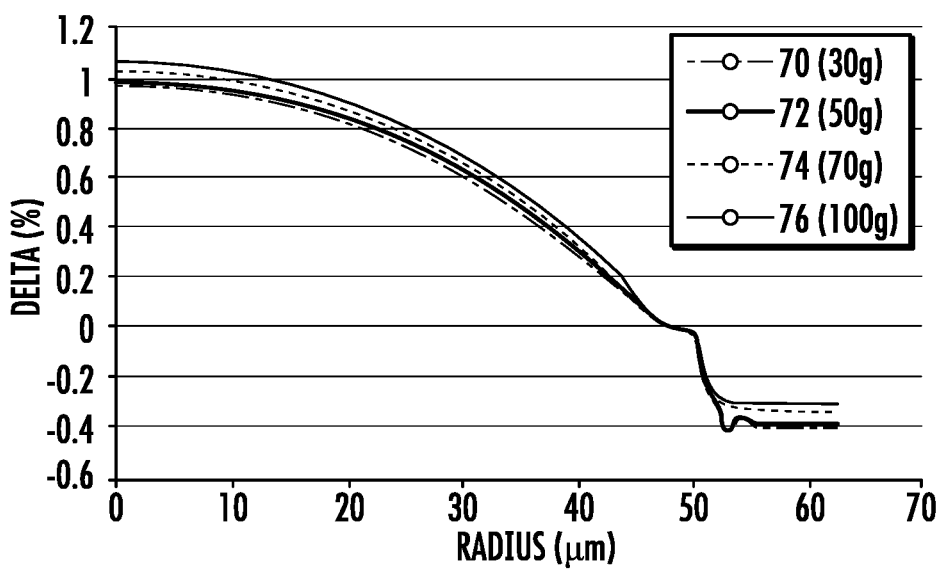
FIG. 9B shows plots of relative refractive index profiles of the multimode optical fibers of FIG. 7A, as a plot of the relative refractive index Δ versus the radial coordinate r.

For example, FIG. 9A provides plots of four optical fibers (70, 72, 74, 76), each having a profile as shown in FIG. 9B and each drawn with a different drawing tension. It is noted that the profile of plot 72, as shown in FIG. 9B, is the same as that shown in FIG. 5. In FIG. 9A, multimode optical fiber 70 is drawn with a 30 g drawing tension, multimode optical fiber 72 is drawn with a 50 g drawing tension, multimode optical fiber 74 is drawn with a 70 g drawing tension, and multimode optical fiber 76 is drawn with a 100 g drawing tension. Although optical fibers 70-76 are drawn with different drawing tensions, they all comprise the same composition. As shown in FIG. 9A, fibers 70, 72, 74, and 76 each provide an optimal effective bandwidth at a different wavelength. Therefore, the wavelength may be optimized based upon the drawing tension of the optical fiber. For example, fiber 74 has an optimal effective bandwidth at about 825 nm, while fiber 72 has an optimal effective bandwidth at about 872 nm. FIG. 9A also shows that fiber 72 has the highest effective bandwidth, as compared with fibers 70, 72, 76. Specifically, fiber 72 has a peak effective bandwidth of 24 GHz-Km. Additionally, fiber 72 has the largest wavelength window with corresponding bandwidths of 4.7 GHz-Km or greater. Specifically, fiber 72 has bandwidths of 4.7 GHz-Km or greater for wavelengths between about 810 nm and 930 nm, which is over a 100 nm window. This is much greater than that required for an OM4 fiber, which is about a 60 nm window. It is noted that the effective bandwidths of optical fibers 70-76, as shown in FIG. 9A, were provided using the encircled flux launch condition such that less than an entirety of their core regions were excited, as discussed above.

FIG. 9A also shows that the optical fibers of the present disclosure have a bandwidth greater than 2470 MHz-km (2.47 GHz-km) at a wavelength of 953 nm and, thus, meet the OM5 standard. More specifically, fibers 70, 72, and 74, as shown in FIG. 9A, each have a bandwidth greater than 2470 MHz-km at a wavelength of 953 nm. However, it is again noted that the optimal bandwidth of the optical fibers disclosed herein is based on the drawing tension of the optical fiber and the wavelength.

Figure 9C:
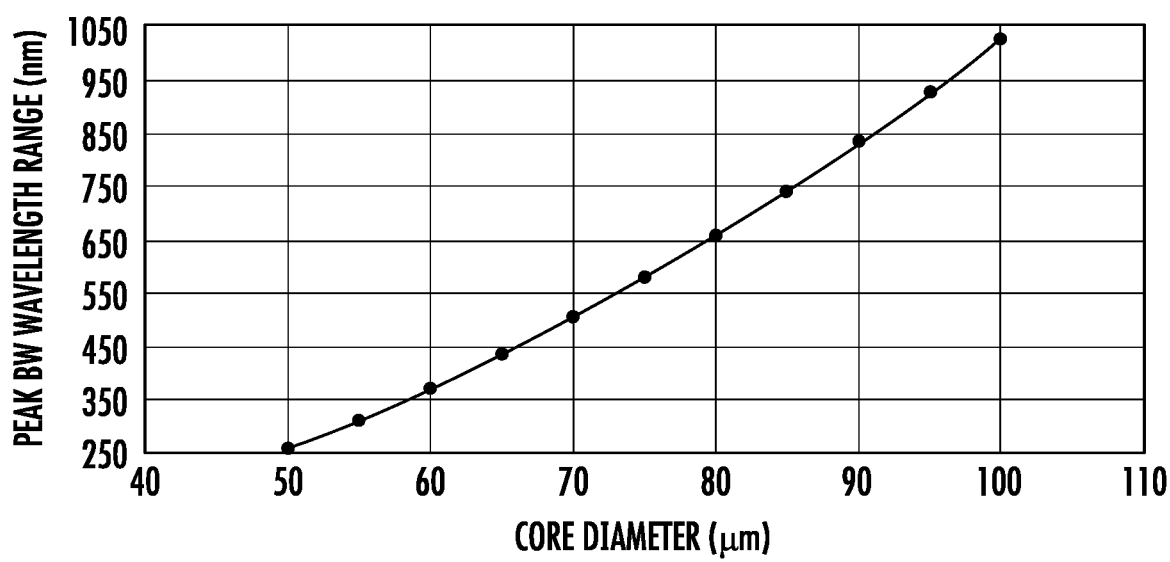
FIG. 9C shows a plot of tension impact on peak bandwidth wavelength range as a function of core diameter, according to embodiments disclosed herein.

Furthermore, the optical fibers of the present disclosure (such as multimode optical fiber 10) have a wide operating wavelength range, which can be optimized to a target peak bandwidth wavelength for a given index profile. Stated another way, the optical fibers of the present disclosure have a wide peak wavelength range, wherein the peak wavelength range is the wavelength window at which an optical fiber has maximum bandwidths over a specified tension range. FIG. 9C shows a plot of core diameter vs. peak bandwidth wavelength range, in which the peak bandwidth range was estimated over the tension range of 45 g to 225 g based on measurements for three multimode optical fibers according to embodiments of the present disclosure. As shown in FIG. 9C, as the core diameter of the optical fiber increases, the wavelength window of the peak bandwidth also increases. More specifically, a 50 micron core diameter has peak bandwidths over a 250 nm wavelength window. However, a 100 micron core diameter has a much larger wavelength window of 1050 nm. Thus, the 100 micron core diameter fiber advantageously has greater tunability than the 50 micron core diameter fiber.

In various embodiments, the peak wavelength may be in a range from about 335 nm to about 1365 nm, or from 840 nm to 1070 nm, or from about 680 to about 1050, or from about 980 nm to about 1050 nm, or from about 1260 nm to about 1360 nm, or from about 1300 nm to about 1320 nm, or any wavelength value therebetween. However, it is understood that the optical fibers disclosed herein may be produced in order to have any peak wavelength.

Multimode optical fiber 10, as disclosed herein, has an increased effective bandwidth without sacrificing attenuation. For example, the optical fibers of the present disclosure may have an attenuation of about 2.7 dB/Km or less, or about 2.6 dB/Km or less, or about 2.5 dB/Km or less, or about 2.4 dB/Km or less, or about 2.3 dB/Km or less at 850 nm. Furthermore, the optical fibers of the present disclosure have an attenuation of about 0.9 dB/Km or less, or about 0.87 dB/Km or less, or about 0.84 dB/Km or less, or about 0.80 dB/Km or less, or about 0.77 dB/Km or less, or about 0.74 dB/Km or less, or about 0.70 dB/Km or less, or about 0.67 dB/Km or less, or about 0.64 dB/Km or less, or about 0.60 dB/Km or less, or about 0.57 dB/Km or less at 1300 nm.

Figure 10:
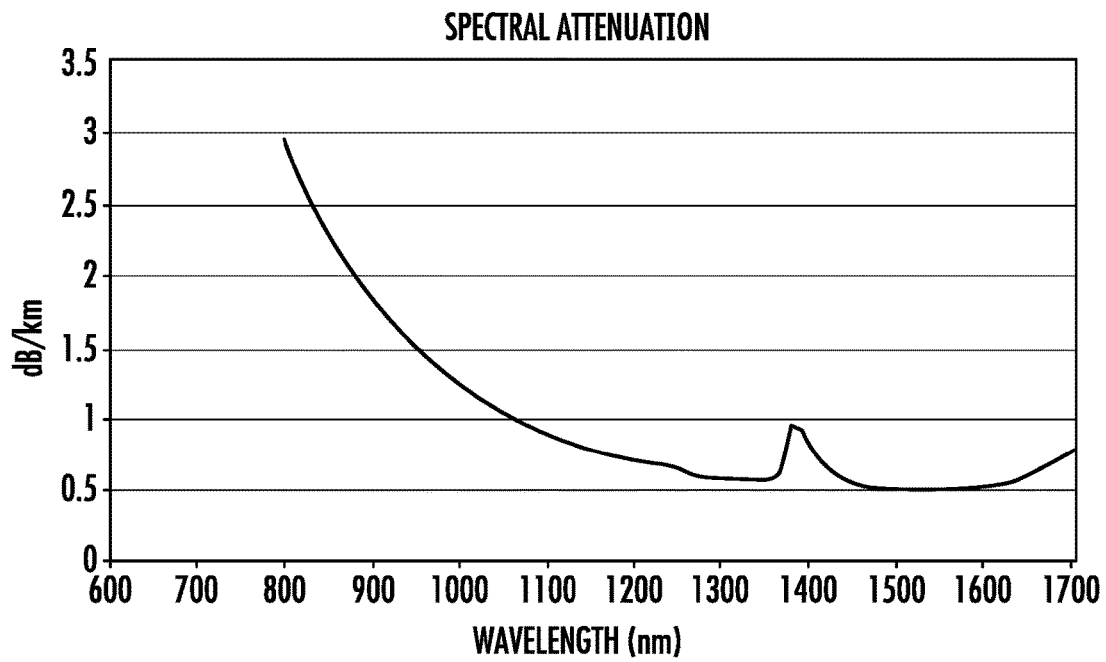
FIG. 10 is a plot of attenuation vs. wavelength for a multimode optical fiber, according to embodiments disclosed herein.

FIG. 10 shows a plot of an optical fiber having the profile as shown in FIG. 5 and drawn with a 50 g drawing tension. As shown in FIG. 10, the attenuation is 2.32 dB/km at 850 nm and is 0.60 dB/km at 1300 nm, which is similar to traditional multimode optical fibers. Thus, the multimode optical fibers of the present disclosure do not have a reduction in attenuation even with the increased effective bandwidth.

The multimode optical fibers of the present disclosure also have reduced insertion loss when connecting the optical fiber to another fiber. Insertion loss is a measure of the amount of light loss when passing from one fiber to another through an optical fiber connector. The amount of light loss is mainly due to lateral core offset. If the mating optical fibers have approximately the same core size but with slightly offset, some light will be directed into the cladding and lost. Insertion loss may also be generated due to different core sizes. For example, some light may be lost in the cladding when an optical fiber has a smaller core diameter than the optical fiber with which it is mated with.

The multimode optical fibers disclosed herein have a larger core compared to traditional multimode optical fibers, as discussed above. Due to the relatively larger core, the multimode optical fibers have a higher tolerance when connecting the fiber to another fiber. More specifically, due to the relatively larger core, the multimode optical fibers disclosed herein are able to capture more light from a fiber it is connected to, which advantageously results in a decreased insertion loss.

Figure 11A:
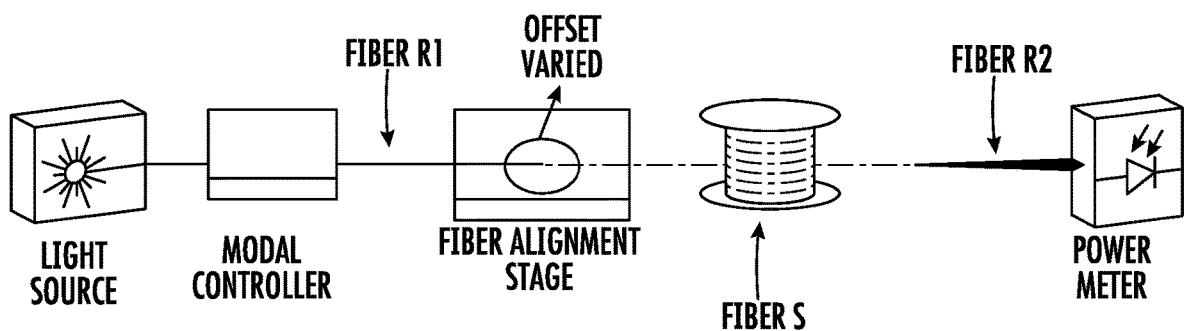
FIG. 11A is a schematic diagram of components to measure relative insertion loss vs. offset of a multimode optical fiber.

FIG. 11A shows the setup used to measure the insertion loss when connecting a traditional OM2, OM3, or OM4 multimode optical fiber (fiber R1 in FIG. 11A) with 1 km of a fiber under test (fiber S in FIG. 11A). The traditional OM2, OM3, or OM4 multimode optical fiber has a core diameter of 50 microns. In a first example, the fiber under test is an exemplary multimode fiber of the present disclosure (plot 82 of FIG. 11B) with a core diameter of 100 microns. The exemplary optical fiber was drawn with a drawing tension of 50 g and has the profile as shown in FIG. 5. In a second example, the fiber under test is a traditional multimode fiber with a core diameter of 50 microns (plot 80 of FIG. 11B). Both multimode optical fibers have an outer diameter of 125 microns.

In the setup of FIG. 11A, a ModCon® is used to provide the encircled flux launch of light into fiber R1 (left side of FIG. 11A). Fiber R1 and test fiber S are put on an alignment stage to place the two fibers center to center and then to vary the offset of the fiber cores by a controlled amount. The output of test fiber S is directly connected to another traditional OM2, OM3, or OM4 multimode optical fiber having a 50 micron core diameter (fiber R2 in FIG. 11A), which is connected to a power meter to measure the optical power. The measured insertion loss is the difference between the amount of optical power launched into fiber R1 and the amount of optical power measured by the power meter. The relative insertion loss is the difference between the measured insertion loss for two fibers that have some amount of core offset and the measured insertion loss for two fibers that are well aligned with minimal to zero core offset. The relative insertion loss for the two fibers under test (as discussed above) is shown in FIG. 11B.

Figure 11B:
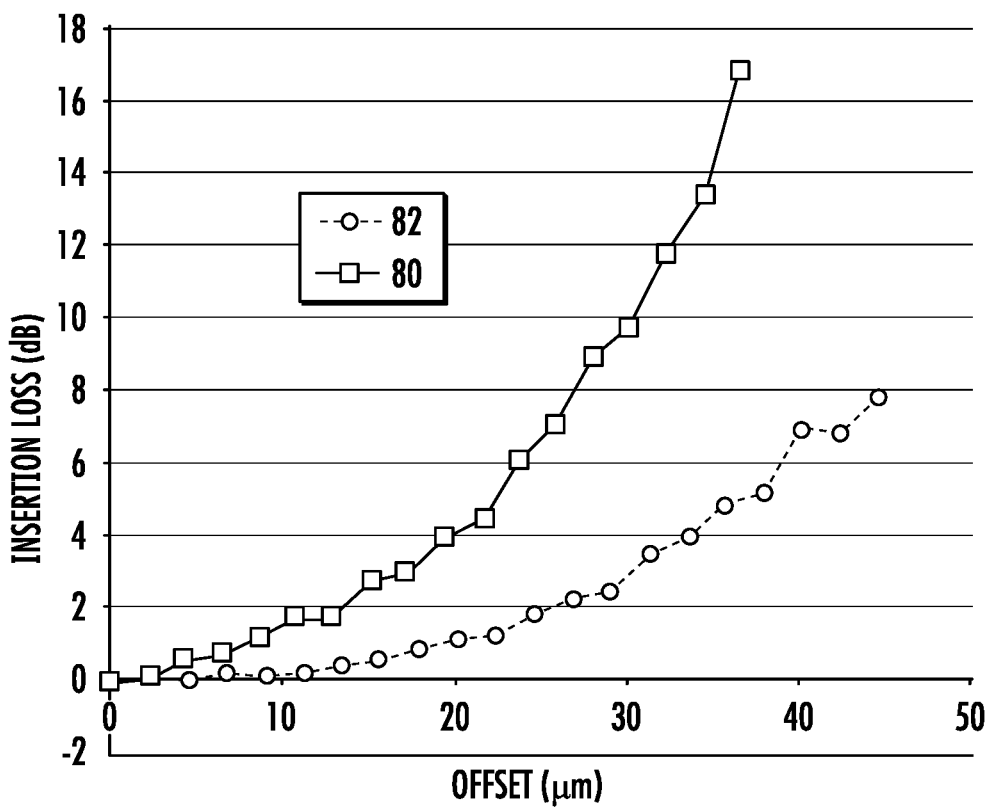
FIG. 11B is a plot of relative insertion loss vs. offset for a multimode optical fiber, according to embodiments disclosed herein, and for a comparative multimode optical fiber.

In FIG. 11B, the horizontal axis represents the shift of fiber cores from an aligned position of the cores. The vertical axis represents the relative insertion loss when the fibers are excited with the encircled flux launch condition. As shown in FIG. 11B, plot 82 has an overall lower relative insertion loss compared with plot 80. For example, with a 10 micron offset, plot 80 has a relative insertion loss of lower than 0.3 dB, while plot 80 has a relative insertion loss of 1.8 dB.

Figure 11C:
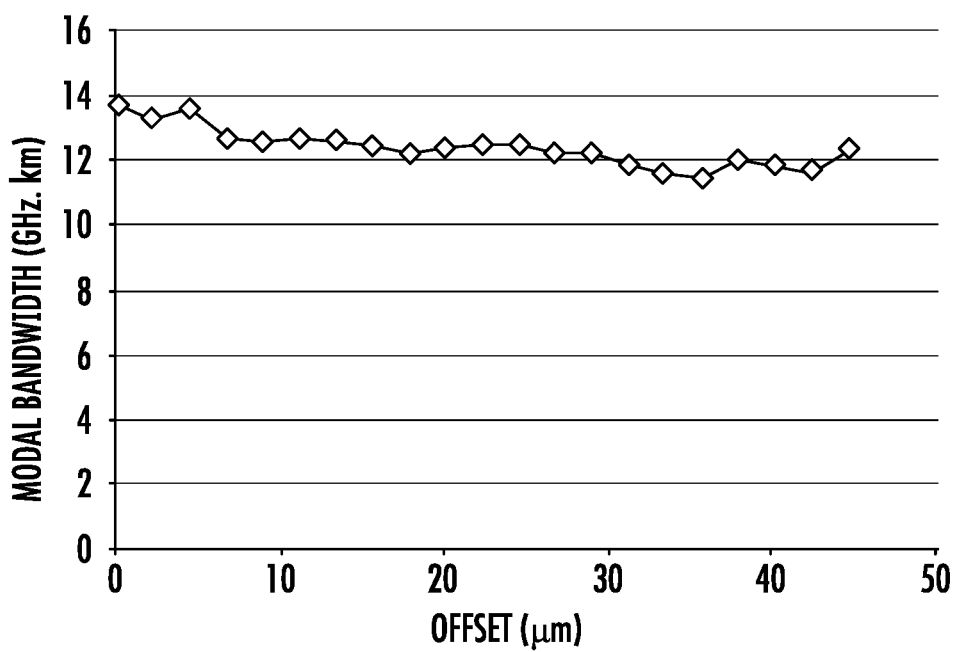
FIG. 11C is a plot of modal bandwidth vs. offset for a multimode optical fiber, according to embodiments disclosed herein.

FIG. 11C shows the modal bandwidth of a multimode optical fiber, having the profile as shown in FIG. 5, drawn with a 50 g drawing tension and at an 850 nm wavelength. As shown in FIG. 11C, the modal bandwidth is consistently high (above 11.5 GHz·km) over a large offset range of up to 45 microns.

Figure 12A:
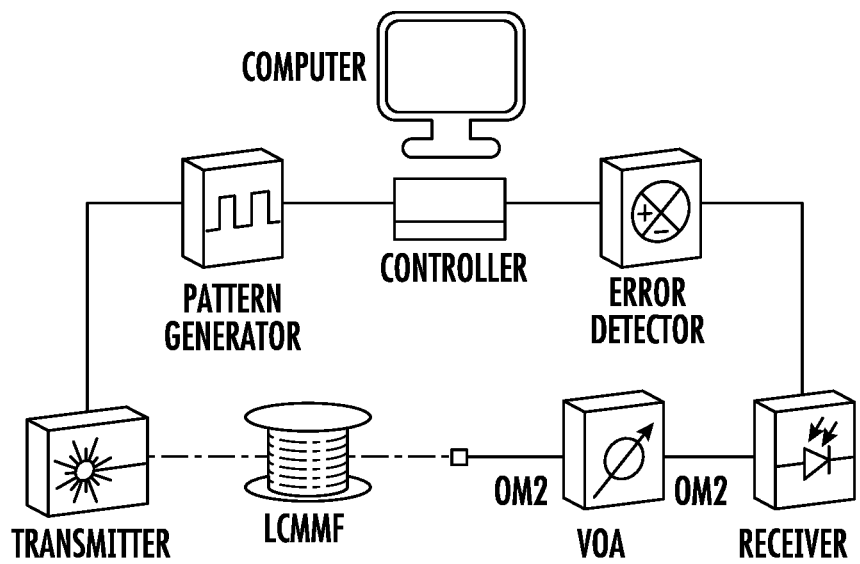
FIG. 12A is a schematic diagram of components to measure the bit error rate.

The transmission performance of the multimode optical fibers of the present disclosure was measured using a number of different configurations. Two sections of the fiber were prepared in lengths of 500 m and 1000 m. The bit-error rate (BER) measurements were done at back-to-back (b-b) lengths of about 200 m, 300 m, and 500 m. As shown in FIG. 12A, a variable optical attenuator was used to vary the level of optical attenuation to obtain the different curves in the plot of FIG. 12B of the BER vs. received optical power P (dBm).

The BER was measured using a 25 Gb/s SR transceiver (Hisense LTF8505-BC+), which is based on a multimode VCSEL transmitter. The system testing setup is shown in 12A. The controller (Keysight N4960A-CJ1) controls the pattern generator (Keysight N4951B) and error detector (N4952A-E32), and also provides a clock signal to the pattern generator, which provides $2^{31}$-1 PRBS pattern. The exemplary multimode fiber of the present disclosure was prepared with lengths of 200 m, 300 m and 500 m.

Figure 12B:
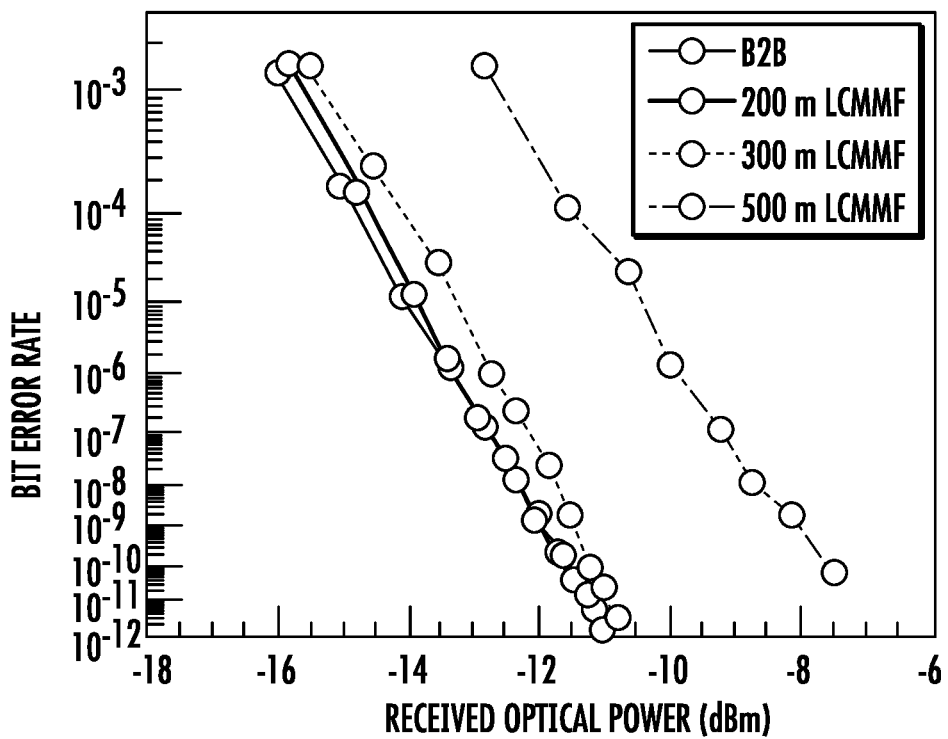
FIG. 12B is a plot of bit error rate vs. received optical power for a multimode optical fiber, according to embodiments disclosed herein.

From the BER plot of FIG. 12B, in the back-to-back (b-b) configuration, the transmission system can reach error free performance at about −11 dBm. With the introduction of the 200 m section of the exemplary fiber, the system shows little power penalty. For the 300 m section of fiber, some power penalty was seen, but substantially error-free performance can be obtained. At the length of 500 m, the system performance degrades, but can still reach a BER of $10^{-11}$, which is below the forward error correction threshold used for short distance optical communications. Without the VOA in the setup, the system with the fiber under test of 200 m, 300 m and 500 m can perform error free for a few minutes.

The multimode optical fibers of the present disclosure may be coupled to a data center, and may transmit data within or between data centers using VCSEL based transceiver over distances in the range of 100 m to 2000 m with possible data rates of 10 Gb/s or higher (e.g., 25 Gb/s or higher, depending on the system capability as limited by power budget and bandwidth of the optical fiber). Higher date rates include 50 Gb/s or 56 Gb/s NRZ or 50 Gb/s using PAM4 modulation format with 25 Gbd or 28 Gbd, or 100 Gb/s using PAM4 modulation format with 50 Gbd or 56 Gbd. Additionally, a VCSEL based transceiver, may propagate light into the multimode optical fiber.

Figure 13A:
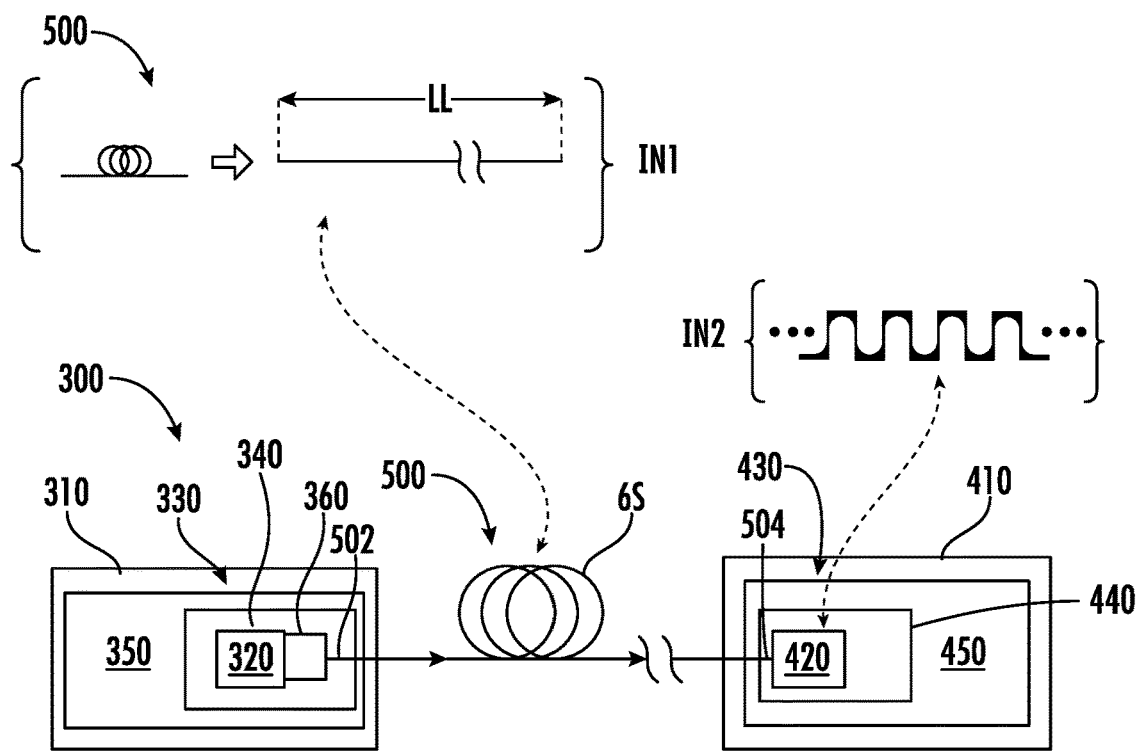
FIG. 13A is a schematic diagram of an exemplary optical fiber data communications system that employs the optical fibers disclosed herein to form the optical fiber link between a VCSEL-based transmitter and a receiver.

FIG. 13A is a schematic diagram of an example optical fiber data communications system ("system") 300 that comprises a transmitter 310 and a receiver 410 optically connected by an optical fiber link 500. The optical fiber link 500 comprises at least a section of a single core multimode optical fiber 6S as disclosed herein. In an example, the optical fiber link 500 has an input end 502, an output end 504, and link length LL measured along the fiber(s) of the link between the input and output ends (see close-up inset IN1, which shows the optical fiber link 500 "unwound" to show the link length LL of the example systems disclosed herein). In an example, the link length is up to 1000 meters. In an example, the optical fiber link 500 can be constituted by a middle section constituted by a section of fiber 6S and input and output end sections constituted by relatively short jumper cables (e.g., a few meters long, at most). In an example, the jumper cables can also be made of the fiber 6S.

An example transmitter 310 includes a VCSEL 320 and a transmitter electronics unit 330 configured to operably support the operation of the VCSEL. In an example, the transmitter electronics unit 330 comprises a transmitter electronic integrated circuit 340 operably supported by a transmitter circuit board (e.g., a printed circuit board or PCB) 350. In an example, the transmitter electronic 340 is configured with a VCSEL driver and related electronic components (not shown) as known in the art.

The receiver 410 comprises a photodetector 420 optically coupled to the output end 504 of the optical fiber link 500. The photodetector 420 is operably supported by a receiver electronics unit 430 configured to operably support the photodetector. In an example, the receiver electronics unit 430 comprises a receiver operably supported by a receiver circuit board (e.g., a printed circuit board or PCB) 450. In an example, photodetector 420 is configured to convert the optical signals OS encoded on the light 324 into electrical signals ES (see the close-up inset IN2 in FIG. 13A), and the receiver is configured to receive and process the electrical signals.

The system 300 is optimized for bandwidth at a wavelength λ between 800 nm and 1100 nm for multimode mode transmission with multimode VCSELs 320.

Figure 13B:
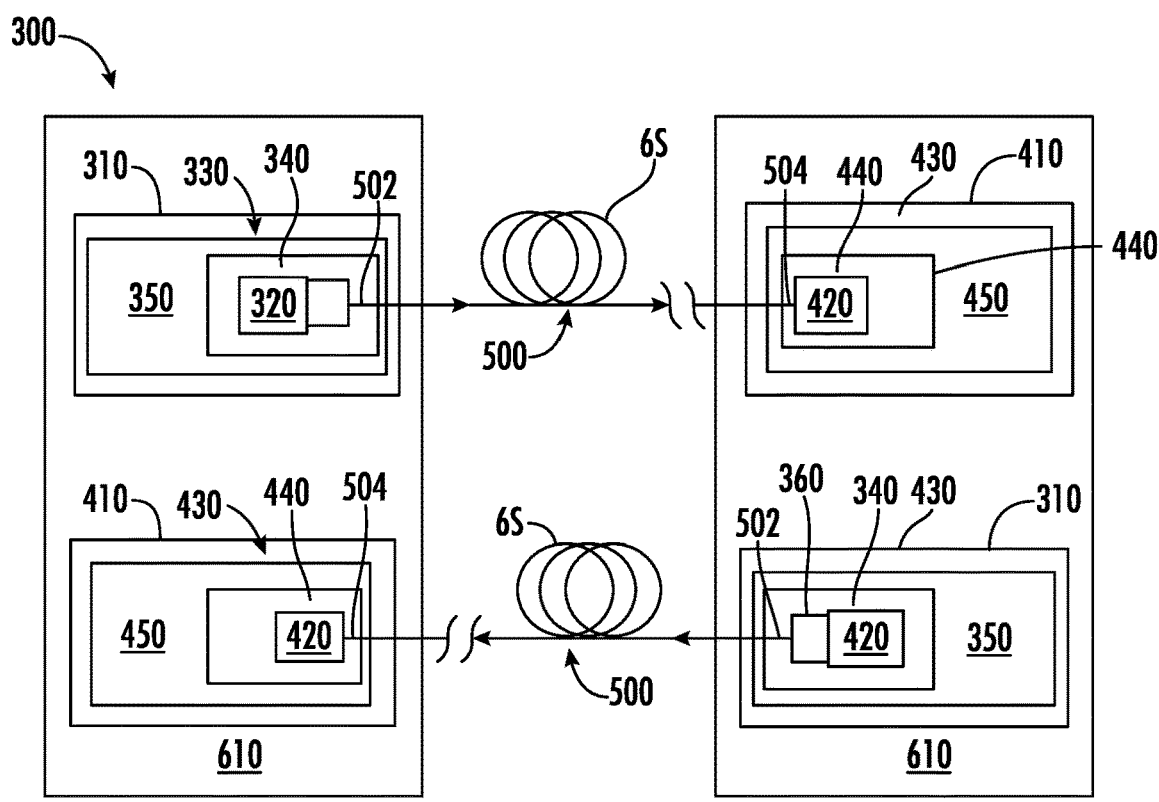
FIG. 13B is similar to FIG. 13A and illustrates an exemplary optical fiber data communications system having two VCSEL-based transceivers.

FIG. 13B is similar to FIG. 13A and illustrates an example system 300 that includes two transceivers 610 in optical communication via two optical fiber links 500. Each transceiver 610 includes the transmitter 310 and the receiver 410. The system 300 provides two-way data communication between the optically coupled transceivers 610 via the two optical fiber links 500.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A multimode optical fiber comprising:
    a core region comprising silica and having an outer radius $r_1$,
    wherein:
        the core region has a maximum relative refractive index of about 1.5% or less,
        the multimode optical fiber is configured to have an effective bandwidth of about 4.7 GHz·Km or greater for an excited portion of the core region that has a radius $r_0$ and a diameter greater than 50 microns, the effective bandwidth being at a wavelength that is within a range of between about 800 nm and about 1370 nm, and the radius $r_0$ of the excited portion of the core region is less than the outer radius $r_1$ of the core region.

2. The multimode optical fiber of claim 1, wherein the excited portion of the core region has a diameter greater than 60 microns.

3. The multimode optical fiber of claim 2, wherein the excited portion of the core region has a diameter of about 70 microns.

4. The multimode optical fiber of claim 1, wherein the excited portion of the core region has an effective relative refractive index within a range of about 0.3% to about 0.80%.

5. The multimode optical fiber of claim 4, wherein the effective relative refractive index of the excited portion of the core region is within a range of about 0.40% to about 0.70%.

6. The multimode optical fiber of claim 5, wherein the effective relative refractive index of the excited portion of the core region is within a range of about 0.45% to about 0.65%.

7. The multimode optical fiber of claim 1, wherein the outer radius $r_1$ of the core region is about 30 microns or greater.

8. The multimode optical fiber of claim 7, wherein the outer radius $r_1$ of the core region is about 45 microns or greater.

9. The multimode optical fiber of claim 8, wherein the outer radius $r_1$ of the core region is about 50 microns or greater.

10. The multimode optical fiber of claim 7, wherein the outer radius $r_1$ of the core region is in a range from about 30 microns to about 62.5 microns.

11. The multimode optical fiber of claim 1, wherein the fiber has a peak wavelength at which the multimode optical fiber has maximum bandwidths, the peak wavelength being within a range from about 335 nm to about 1365 nm.

12. The multimode optical fiber of claim 1, wherein the maximum relative refractive index is in a range from about 0.7% to about 1.5%.

13. The multimode optical fiber of claim 12, wherein the maximum relative refractive index is about 1.0%.

14. The multimode optical fiber of claim 1, wherein the effective bandwidth is about 6 GHz-Km or greater for the excited portion of the core region.

15. The multimode optical fiber of claim 14, wherein the effective bandwidth is about 7 GHz-Km or greater for the excited portion of the core region.

16. The multimode optical fiber of claim 1, further comprising a cladding region surrounding the core region.

17. The multimode optical fiber of claim 16, wherein the cladding region does not comprise an up-dopant.

18. An optical fiber data transmission system comprising:
an optical fiber link comprising the multimode optical fiber of claim 1, wherein the optical fiber link has an input end, an output end and a link length LL between the input and output ends, wherein LL<1000 meters;
a transmitter comprising a vertical-cavity surface-emitting laser (VCSEL) that emits light having a wavelength in a wavelength range and that carries optical signals at a data rate of at least 10 Gb/s, wherein the VCSEL is optically coupled to the input end of the optical fiber link; and
a receiver comprising a photodetector optically coupled to the output end of the optical fiber link and configured to receive the optical signals and convert the optical signals to electrical signals.

19. A multimode optical fiber comprising:
a core region comprising silica and having an outer radius $r_1$ that is about 30 microns or greater,
wherein the core region is configured to have an effective relative refractive index within a range of about 0.30% to about 0.80% for an excited portion of the core region that has a radius $r_0$ and a diameter greater than 50 microns,
the radius $r_0$ of the excited portion of the core region being less than the outer radius $r_1$ of the core region.

20. The multimode optical fiber of claim 19, wherein the effective relative refractive index for the excited portion of the core region is within a range of about 0.40% to about 0.70%.

* * * * *